United States Patent
Rangaraju et al.

(10) Patent No.: US 9,600,342 B2
(45) Date of Patent: Mar. 21, 2017

(54) MANAGING PARALLEL PROCESSES FOR APPLICATION-LEVEL PARTITIONS

(71) Applicant: Oracle International Corporation, Redwood Shores, CA (US)

(72) Inventors: Ramasimha Rangaraju, Bangalore (IN); Virad Gupta, Fremont, CA (US); Deepankar Narayanan, Trivandrum (IN); Raghu Edalur, San Ramon, CA (US); Mohini Sahoo, Bangalore (IN); Vivek Verma, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 58 days.

(21) Appl. No.: 14/796,643

(22) Filed: Jul. 10, 2015

(65) Prior Publication Data
US 2016/0011911 A1    Jan. 14, 2016

Related U.S. Application Data

(60) Provisional application No. 62/022,953, filed on Jul. 10, 2014.

(51) Int. Cl.
  *G06F 9/46* (2006.01)
  *G06F 9/50* (2006.01)
  *G06F 17/30* (2006.01)

(52) U.S. Cl.
  CPC ...... *G06F 9/5061* (2013.01); *G06F 17/30339* (2013.01)

(58) Field of Classification Search
  None
  See application file for complete search history.

(56) References Cited

U.S. PATENT DOCUMENTS

| | | |
|---|---|---|
| 5,029,080 A | 7/1991 | Otsuki |
| 6,272,498 B1 | 8/2001 | Muthukrishnan et al. |

(Continued)

FOREIGN PATENT DOCUMENTS

| | | |
|---|---|---|
| EP | 2154618 A2 | 2/2010 |
| WO | 2013/178286 A1 | 12/2013 |
| WO | 2014/019056 A1 | 2/2014 |

OTHER PUBLICATIONS

Dean et al.; "MapReduce: Simplified Data Processing on Large Clusters", Communications of the ACM Jan. 2008/vol. 51, No. 1 (Dean_2008.pdf; pp. 1-7).*

(Continued)

*Primary Examiner* — Hiren Patel
(74) *Attorney, Agent, or Firm* — Kilpatrick Townsend & Stockton LLP

(57) ABSTRACT

Various techniques are described herein for creating data partition process schedules and executing such partition schedules using multiple parallel process instances. Data processing tasks initiated by or for applications may be executed by creating and executing partition schedules, in which a number of different process instances are created and each assigned a subset of data to process. Partition schedules may be used to determine a number of process instances to be created, and each process instance may be assigned a unique set of run-time data values corresponding to a unique set of parameters within the data set to be processed by the application. The process instances may operate independently and in parallel to retrieve and process separate partitions of the data required for the overall data processing task initiated by/for the application.

17 Claims, 25 Drawing Sheets

(56) References Cited

U.S. PATENT DOCUMENTS

| | | | |
|---|---|---|---|
| 6,725,448 B1 | 4/2004 | Moriya et al. | |
| 6,963,870 B2 | 11/2005 | Heckerman | |
| 7,328,192 B1* | 2/2008 | Stengard | G06F 17/30289 706/12 |
| 7,415,473 B2 | 8/2008 | Zimmerer | |
| 7,707,544 B2* | 4/2010 | Beust | G06F 8/30 717/106 |
| 8,510,538 B1* | 8/2013 | Malewicz | G06F 7/38 712/220 |
| 8,583,687 B1 | 11/2013 | Piedmonte et al. | |
| 2004/0236715 A1* | 11/2004 | Krebs | G06F 9/445 |
| 2005/0223046 A1* | 10/2005 | Smith | G06F 17/30339 |
| 2007/0106666 A1* | 5/2007 | Beckerle | G06F 17/30575 |
| 2009/0112533 A1* | 4/2009 | Grichnik | G06F 19/3437 703/2 |
| 2009/0319992 A1* | 12/2009 | Duffy | G06F 8/00 717/121 |
| 2010/0077006 A1* | 3/2010 | El Emam | G06F 17/30536 707/785 |
| 2010/0115246 A1* | 5/2010 | Seshadri | G06F 17/30445 712/225 |
| 2010/0122065 A1* | 5/2010 | Dean | G06F 17/30445 712/203 |
| 2011/0066481 A1 | 3/2011 | Vazacopoulos et al. | |
| 2012/0117008 A1 | 5/2012 | Xu et al. | |
| 2012/0240124 A1* | 9/2012 | Lipton | G06F 9/5066 718/104 |
| 2012/0324469 A1* | 12/2012 | Nishihara | G06F 9/50 718/104 |
| 2013/0246438 A1* | 9/2013 | Gestrelius | G06F 17/30324 707/745 |
| 2013/0290352 A1 | 10/2013 | Chen et al. | |
| 2013/0339321 A1* | 12/2013 | Doddavula | G06F 17/30584 707/693 |
| 2014/0059052 A1 | 2/2014 | Yamamoto | |
| 2014/0201744 A1* | 7/2014 | Chu | G06F 9/4843 718/100 |
| 2014/0280372 A1 | 9/2014 | Huras et al. | |
| 2014/0380322 A1* | 12/2014 | Ailamaki | G06F 9/4843 718/102 |
| 2015/0032759 A1* | 1/2015 | Lee | G06F 17/30705 707/741 |
| 2015/0120750 A1* | 4/2015 | Hefeeda | G06F 17/30961 707/741 |
| 2015/0134699 A1* | 5/2015 | Bhide | H04L 67/1097 707/781 |

OTHER PUBLICATIONS

Stohr et al.; "Multi-Dimentional Database Allocation for Parallel Data Warehouses" Proceedings of the 26th International conference on Very Large Databases, Cairo, Egypt, 2000 (Stohr_2000.pdf; pp. 1-12).*

Author Unknown, "Data Partitioning Guidance," Microsoft, [accessed on Aug. 14, 2015] 7 pages. Retrieved from: http://msdn.microsoft.com/en-us/library/dn589795.aspx.

Author Unknown, "Generating a Cartesian Product," SAS OnlineTutor, [accessed on Aug. 20, 2015] 2 pages. Retrieved from: http://web.utk.edu/sas/OnlineTutor/1.2/en/60477/m71/m71_3.htm.

Blizinski, Maciej, "Cartesian Product of Multiple Sets," Maciej Blizinski, [accessed on Aug. 20, 2015] 3 pages. Retrieved from: https://automatthias.wordpress.com/2007/04/28/cartesian-product-of-multiple-sets/.

Bourrillion et al, "Class Sets," Google, [accessed on Aug. 20, 2015] 14 pages. Retrieved from: http://docs.guava-libraries.googlecode.com/git/javadoc/com/google/common/collect/Sets.html.

Broadhurst, Martin, "Combinatorial Algorithmsm," Martin Broadhurst, [accessed on Aug. 20, 2015] 18 pages. Retrieved from: http://www.martinbroadhurst.com/combinatorial-algorithms.html.

Gilaani et al., "Analyzing Large Datasetts with Hive," IBM, [Accessed on Aug. 14, 2015] 10 pages. Retrieved from: http://www.ibm.com/developerworks/library/bd-hiveanalyze/.

Grosky, William I., "Dynamic Maintainance of Multidimensional Range Data Patitioning for Parallel Data Processing," Junping Sun, [Accessed on Aug. 14, 2015] 8 pages. Retrieved from: http://www.cis.drexel.edu/faculty/song/dolap/dolap98/paper/DOLAP98_Sun.pdf.

Katsov, Ilya, "In-Stream Big Data Processing," Highly Scalable Blog, [accessed on Aug. 14, 2015] 18 pages. Retrieved from: http://highlyscalable.wordpress.com/2013/08/20/in-stream-big-data-processing/.

Kumbhakarna, Viraj, "A Practical Approach to Process Improvement Using Parallel Processing," PharmaSUG2011, [accessed on Aug. 14, 2015] 16 pages. Retrieved from: http://www.pharmasug.org/proceedings/2011/PO/PharmaSUG-2011-PO03.pdf.

* cited by examiner

```
class PRTNTEST extends PTPARTITION_PKG:PTPARTITIONINTF
   method GetPartitionFields() Returns array of string;
   method GetPartitionValues(&iField As string) Returns array of string;
end-class;

/+ Extends/implements
PTPARTITION_PKG:PTPARTITIONINTF.GetPartitionFields +/
method GetPartitionFields
   /+ Returns Array of String containing partitioned field names +/
   Return &ostrarray;
end-method;

/+ Extends/implements
PTPARTITION_PKG:PTPARTITIONINTF.GetPartitionValues +/
method GetPartitionValues
   /+ Returns Array of String containing partition field values for the input field +/
   Return &ostrValues;
end-method;
```

FIG. 6E

| Num | Field Name | Type | Len | Format | Short Name | Long Name |
|---|---|---|---|---|---|---|
| 1 | PTSCHDL_NAME | Char | 30 | Mixed | prtn | Partition Schedule |
| 2 | PRCSTYPE | Char | 30 | Mixed | Type | Process Type |
| 3 | PRCSNAME | Char | 12 | Upper | Name | Process Name |
| 4 | OUTDESTTYPE | Char | 3 | Upper | Type | Output Destination Type |
| 5 | OUTDESTFORMAT | Char | 3 | Upper | Format | Output Destination Form |
| 6 | OUTDEST | Char | 127 | Mixed | Destination | Output Destination |
| 7 | BCNAME | Char | 30 | Upper | Name | Component Interface Na |
| 8 | SCHDL_APPCLASS | Char | 1 | Upper | cls | Application Class |

| Num | Field Name | Type | Len | Format | Short Name | Long Name |
|---|---|---|---|---|---|---|
| 1 | PTSCHDL_NAME | Char | 30 | Mixed | prtn | Partition Schedule |
| 2 | SCHDL_PARTNFLD | Char | 30 | Upper | Fld | Partition Field |
| 3 | PTSCHED_LOOKUPCI | Char | 1 | Upper | Select | Select |
| 4 | SCHDL_APPCLS_NAME | Char | 254 | Upper | Dtl | Class Details |

| Num | Field Name | Type | Len | Format | Short Name | Long Name |
|---|---|---|---|---|---|---|
| 1 | PTSCHDL_NAME | Char | 30 | Mixed | prtn | Partition Schedule |
| 2 | OPRID | Char | 30 | Mixed | User | User ID |
| 3 | RUN_CNTL_ID | Char | 30 | Mixed | Run Cntl | Run Control ID |
| 4 | SERVERNAME | Char | 8 | Upper | Server | Server Name |

FIG. 6F

PTPRTNSCHDL (Record)

Record Fields

| Num | Field Name | Type | Len | Format | Short Name | Long Name |
|---|---|---|---|---|---|---|
| 1 | PTSCHDL_NAME | Char | 30 | Mixed | prtn | Partition Schedule |
| 2 | PRCSTYPE | Char | 30 | Mixed | Type | Process Type |
| 3 | PRCSNAME | Char | 12 | Upper | Name | Process Name |
| 4 | OUTDESTTYPE | Char | 3 | Upper | Type | Output Destination Type |
| 5 | OUTDESTFORMAT | Char | 3 | Upper | Format | Output Destination Form |
| 6 | OUTDEST | Char | 127 | Mixed | Destination | Output Destination |
| 7 | BCNAME | Char | 30 | Upper | Name | Component Interface Na |
| 8 | SCHDL_APPCLASS | Char | 1 | Upper | cls | Application Class |

Record Fields

| Num | Field Name | Type | Len | Format | Short Name | Long Name |
|---|---|---|---|---|---|---|
| 1 | PTSCHDL_NAME | Char | 30 | Mixed | prtn | Partition Schedule |
| 2 | SCHDL_INSTANCE | Sign | 5 | | inst | Schedule Instance |
| 3 | PARTTION_NBR | Sign | 5 | | nbr | Partition Number |
| 4 | PRCSINSTANCE | Nbr | 10 | Raw B | Instance | Process Instance |

Record Fields

| Num | Field Name | Type | Len | Format | Short Name | Long Name |
|---|---|---|---|---|---|---|
| 1 | PTSCHDL_NAME | Char | 30 | Mixed | prtn | Partition Schedule |
| 2 | SCHDL_INSTANCE | Sign | 5 | | inst | Schedule Instance |
| 3 | OPRID | Char | 30 | Mixed | User | User ID |
| 4 | INSTCREATEDTTM | DtTm | 26 | Scrnds | on | Created On |
| 5 | ARCHIVE_PRTN | Char | 1 | Upper | Ar | Archive |
| 6 | RUNSTATUS | Char | 2 | Upper | Run Status | Process Run Status |

MANAGING PARALLEL PROCESSES FOR APPLICATION-LEVEL PARTITIONS

RELATED APPLICATIONS

The present application is a non-provisional of and claims priority to U.S. Provisional Patent Application No. 62/022,953, filed Jul. 10, 2014, entitled "PARALLEL PROCESSING AND AUTOMATION OF BUSINESS PROCESS EXECUTION IN DISTRIBUTED ENVIRONMENTS," the contents of which are incorporated herein by reference for all purposes.

BACKGROUND

Applications that process large data sets may face technical challenges and difficulties with respect to processing performance, application stability, and scalability, among other potential problems. For example, data processing applications may be slow to complete and may encounter additional stability problems when applied to very large data sets. Such large-scale data processing applications have become more common as the data volumes collected and analyzed by companies and other organizations has increased. At the same time, such organizations may have decreasing time windows to complete these large-scale processing tasks.

Despite advances in hardware, faster processors, virtualization techniques, cloud computing, and the like, organizations still face challenges and difficulties in performing large-scale data processing tasks.

BRIEF SUMMARY

Embodiments of the invention provide techniques for creating data partition process schedules and executing such partition schedules using multiple parallel process instances. In some examples, one or more applications may be programmed to perform data processing tasks on data records within data stores. Such applications may include, for example, enterprise applications, data mining applications, document management applications, customer relationship management applications, e-Commerce applications, and various other applications configured to perform data processing tasks involving quantities of data and/or data-intensive analyses. In various embodiments, data processing task(s) initiated by or for such applications may be executed by creating and executing data partition process schedules, or partition schedules, in which a number of different process instances are created and each assigned a subset of data to process. In some cases, partition schedules may be used to determine a number of process instances to be created as a set of process instances to perform the data processing task(s), and each process instance may be assigned a unique (i.e., unique with respect to the set of process instances) set of run-time data values corresponding to a unique set of parameters within the data set to be processed by the application. Partition schedules may identify or reference sets of partition parameters and/or application classes that may be used to determine a number of different process instances to be created, and to assign each process instance a distinct partition of the data set to retrieve and process.

Unique combinations of parameter values may be generated and provided to each new process instance, and each process instance may use its unique parameter values to retrieve and process a separate data partition within an application data store. The process instances may operate independently and in parallel to retrieve and process separate portions of the data required for the overall data processing task initiated by/for the application. In some cases, individual process instances may execute at the application level to perform data processing on target data that is either retrieved from an underlying data store or has been cached at the application layer. The process instances also may be created having a child-parent relationship to a partition scheduler used to control and monitor the execution of the process instances. For example, the process instances may be configured to transmit data processing status messages to the partition scheduler or other monitoring processes, allowing a partition manager to monitor and control execution of the individual process instances and the overall data processing tasks.

BRIEF DESCRIPTION OF THE DRAWINGS

FIGS. 6A-6G illustrate example interfaces and related data structures provided by a partition manager for creating a partition schedule, according to one or more embodiments of the present invention.

FIGS. 9A-9K illustrate example interfaces provided by a partition manager for executing and monitoring partition schedules, according to one or more embodiments of the present invention.

DETAILED DESCRIPTION

Figure 1:
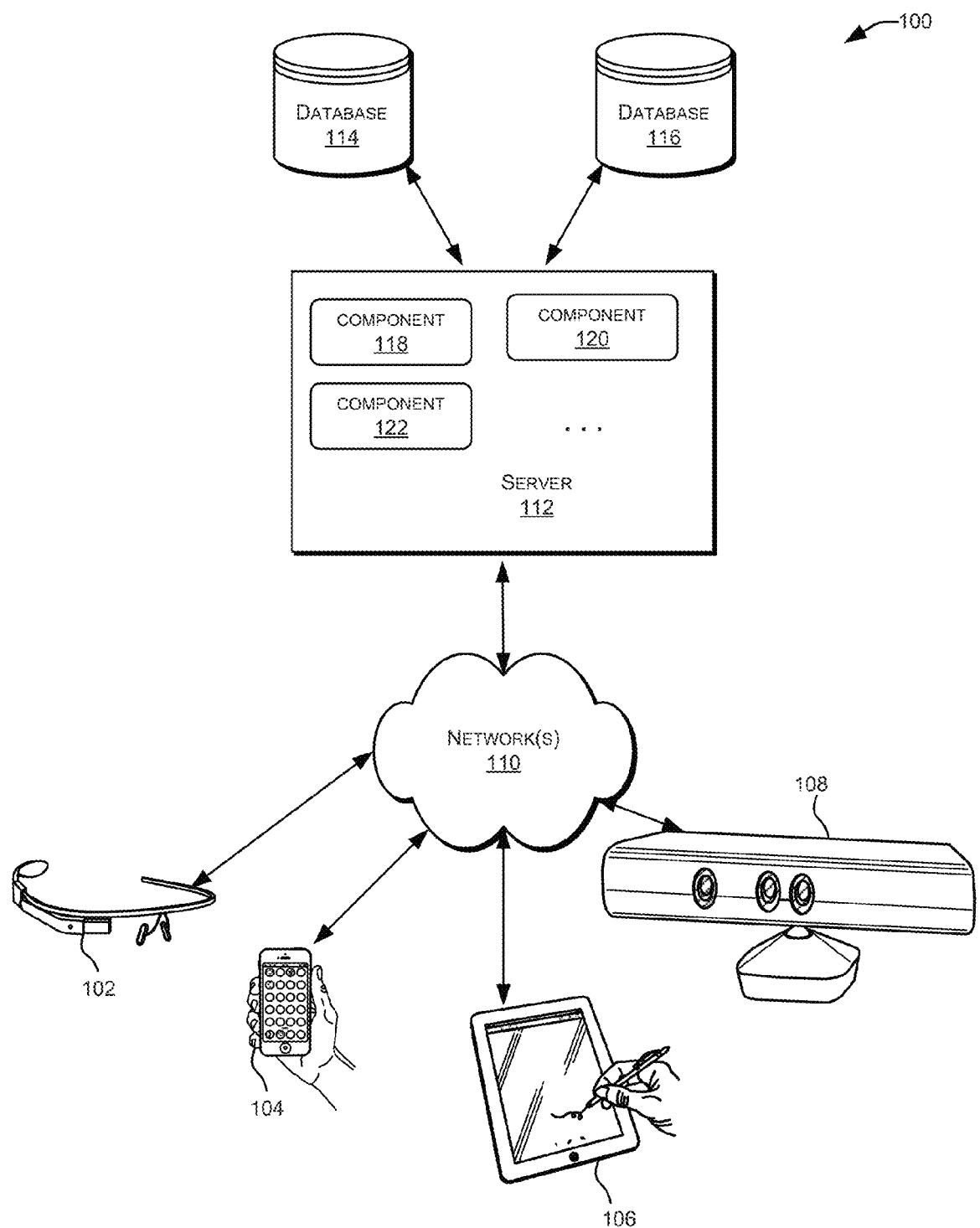
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description and referenced figures to provide a thorough understanding of the embodiments. However, it will be understood by one of ordinary skill in the art that the embodiments may be practiced without these specific details. For example, certain circuits, systems, networks, processes, and other components may be described or shown in block diagram form, in order not to obscure the embodiments in unnecessary detail. Additionally, certain well-known circuits, processes, algorithms, structures, and techniques may be excluded and/or shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to non-transitory media such as portable or fixed storage devices, optical storage devices, and various other media capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various techniques (e.g., methods, systems, non-transitory computer-readable storage memory storing a plurality of instructions executable by one or more processors, etc.) are described herein for creating data partition process schedules and executing such partition schedules using multiple parallel process instances. In some examples, one or more applications may be programmed to perform data processing tasks on data records within data stores. Such applications may include, for example, enterprise applications data mining applications, document management applications, customer relationship management applications, e-Commerce applications, and various other applications configured to perform data processing tasks involving quantities of data and/or data-intensive analyses. In various embodiments, data processing tasks initiated by or for such applications may be executed by creating and executing data partition process schedules, or partition schedules, in which a number of different process instances are created and each assigned a subset of data to process. In some cases, partition schedules may be used to determine a number of process instances to be created, and each process instance may be assigned a unique (i.e., unique with respect to the set of process instances) set of run-time data values corresponding to a unique set of parameters within the data set to be processed by the application. Partition schedules may identify or reference sets of partition parameters and/or application classes that may be used to determine a number of different process instances to be created, and to assign each process instance a distinct partition of the data set to retrieve and process In some embodiments, unique combinations of parameter values may be generated and provided to each new process instance, and each process instance may use its unique parameter values to retrieve and process a separate data partition within an application data store. The process instances may operate independently and in parallel to retrieve and process separate portions of the data required for the overall data processing task initiated by/for the application. In some cases, individual process instances may execute at the application level to perform data processing on target data that is either retrieved from an underlying data store or has been cached at the application layer. The process instances also may be created having a child-parent relationship to a partition scheduler used to control and monitor the execution of the process instances. For instance, the process instances may be configured to transmit data processing status messages to the partition scheduler or other monitoring processes, allowing a partition manager to monitor and control execution of the individual process instances and the overall data processing tasks.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, smart phone or tablet app, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software-as-a-Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
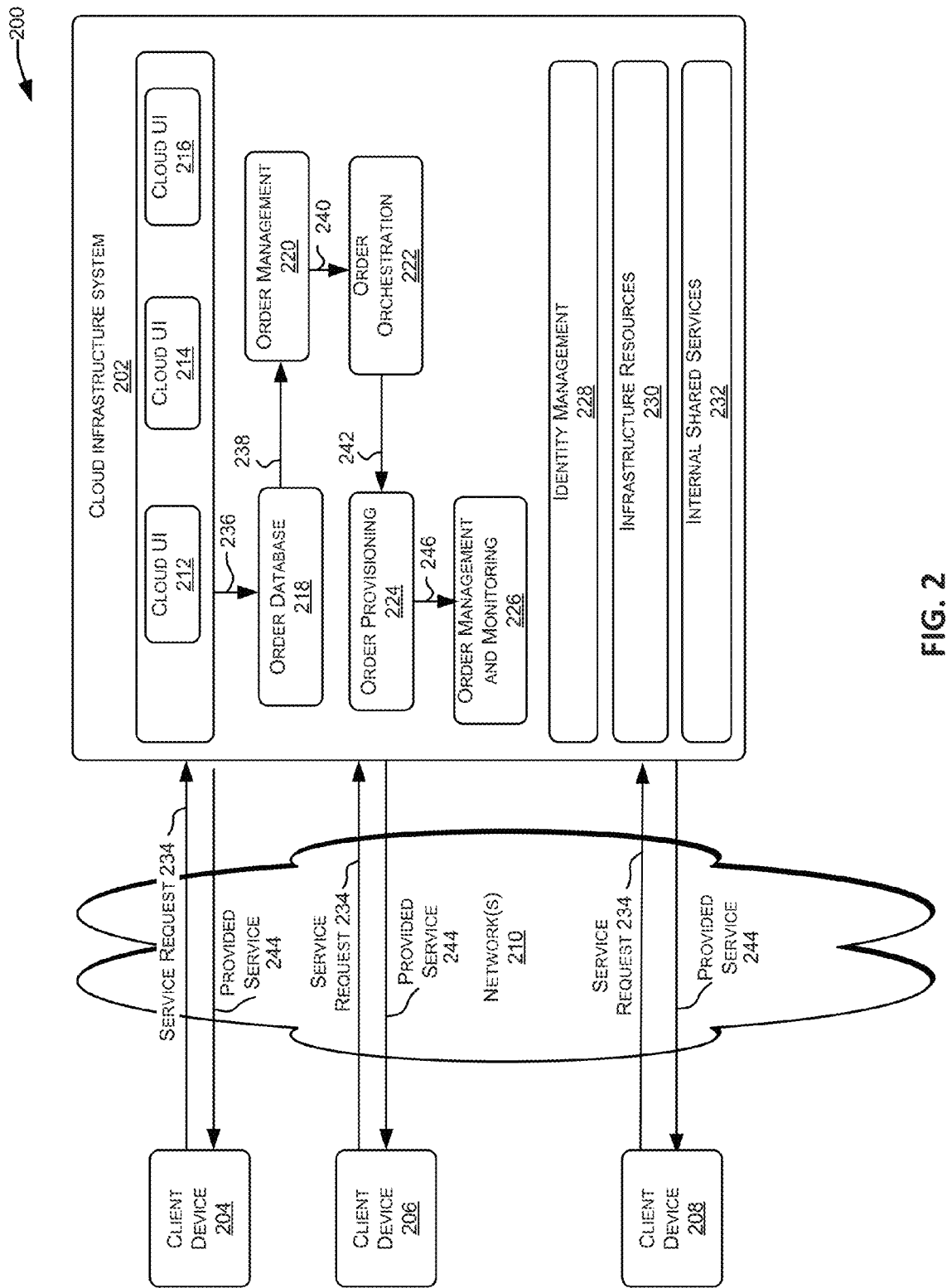
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc., may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage, and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
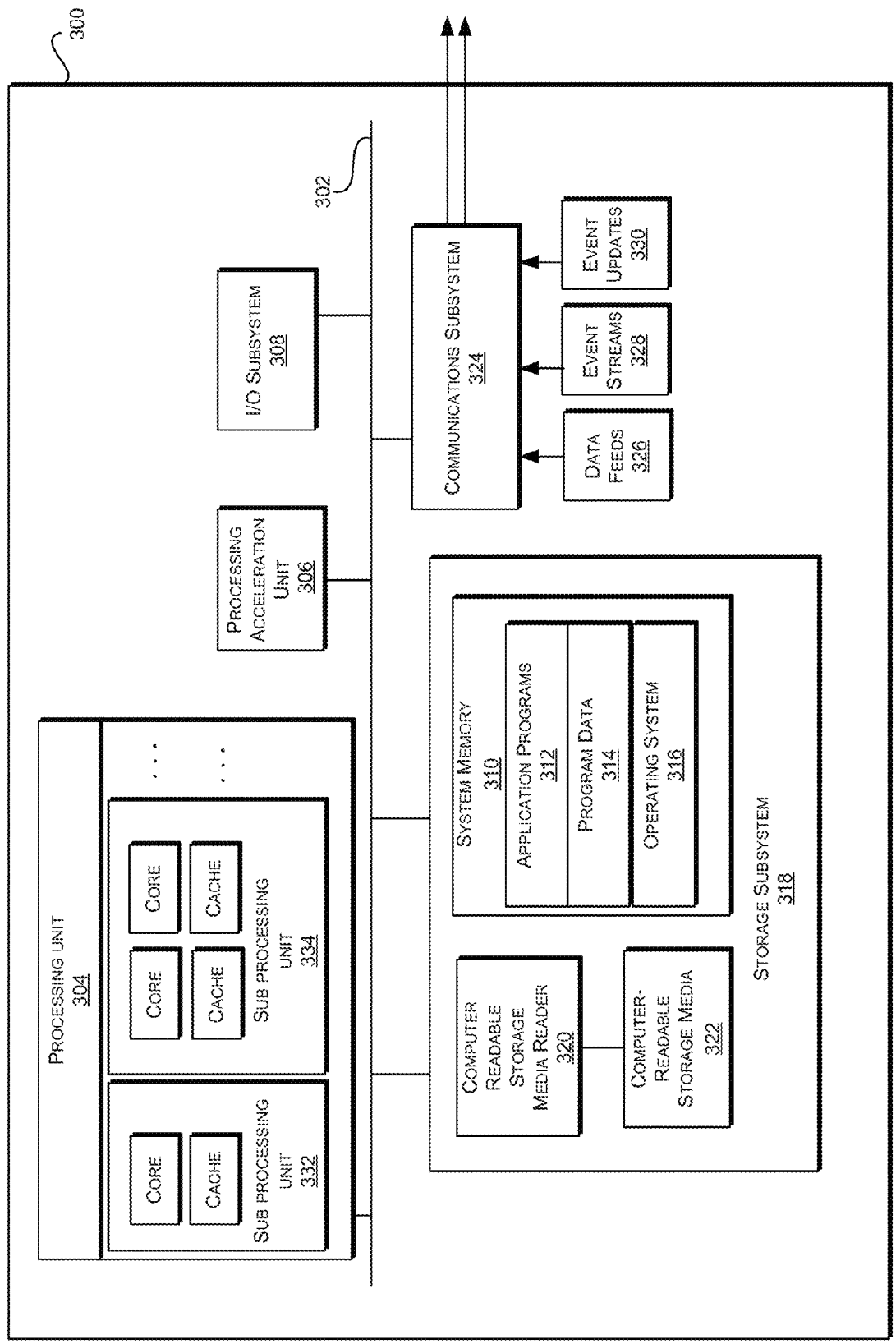
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Sirit navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
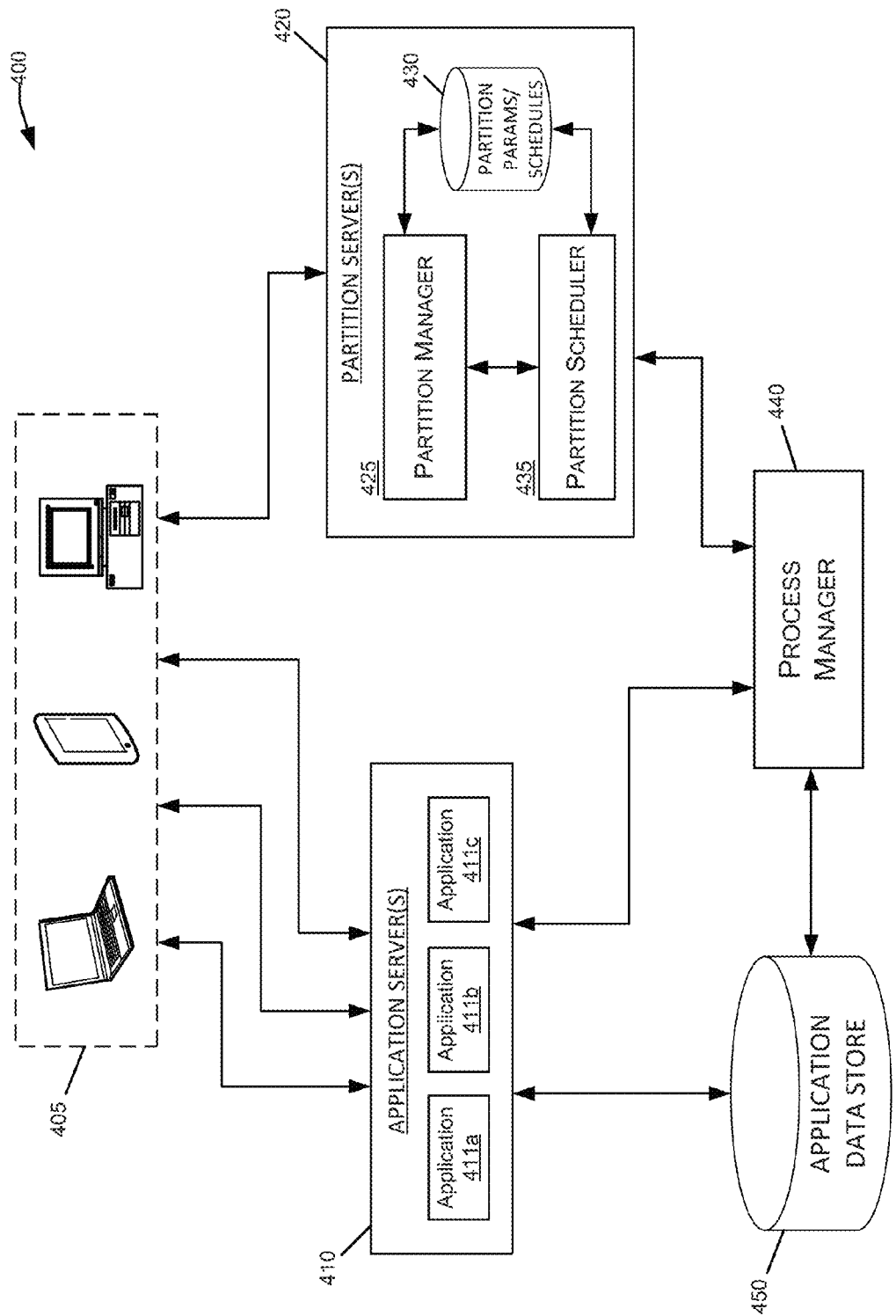
FIG. 4 is a block diagram illustrating, at a high-level, components of a system for scheduling and managing data partition processes, in which embodiments of the present invention may be implemented.

FIG. 4 is a block diagram illustrating a computing environment 400 comprising a system for scheduling and managing process instances configured to process different data portions (or partitions) within a data set, according to various embodiments described herein. In this example, computing environment 400 includes one or more client devices 405 which interact with software applications (e.g., 411a-411c) executing on application servers 410. Such applications 411 may manipulate sets of underlying application data in one or more data stores 450, including storing, maintaining, and processing data sets in accordance with application-specific functionality. Client devices 405 also may interact with one or more additional servers/systems, such as a partition server, to perform the data partitioning functionality described herein. For example, a set of interfaces exposed by a partition manager 425 may allow users to define and create data partition process schedules (also referred to as partition schedules), which may be executed by a partition scheduler 435 and/or process manager 440.

As described below, system 400 and other systems described herein may be used to perform automated and parallel processing of data within computing environments. For example, the techniques described herein may relate to systems 400 for enhancing performance of data processing tasks performed by applications 411, by dynamically creating multiple parallel processes (or process instances) configured to process different portions (or partitions) of a data set stored in a back-end data store (e.g., a database server or application-level cache). Thus, the techniques described herein may be referred to as data partitioning techniques, because the creation of multiple process instances to retrieve and process separate portions (or partitions) of a uniform data set may effectively partition the data set for the purposes of the data processing task. However, it should be understood that the data partitioning techniques described herein are independent and separate from any partitioning schemes or other data storage techniques used by the back-end data store, such as table partitioning. The data partitioning techniques described herein may be performed by creating multiple process instances, each of which is configured and/or assigned to process a different partition of an underlying data set. Each process instance may be provided a unique combination of parameter values, which may be determined independently of the backend data store in which the underlying data tables are stored. That is, the back-end data store storing the underlying data set to be processed by the application may use table partitioning and/or other data storage partitioning technologies, or might not use such data storage partitioning technologies. The use (or lack of use) of such data storage partitioning technologies, or any underlying design and implementation decisions for the back-end data storage, need not affect the operation of the data partitioning techniques described herein. In some cases, the parameters identified within the data set and the unique combinations of parameter values provided to the process instances to perform the data partitioning techniques described herein, may be different from an additional set of parameters used by a partitioning scheme within the back-end data store storing the data tables.

In some cases, multiple process instances may be created to process separate partitions of a data set in real-time, in response to an initiation of a data processing task by an application on the data set. Although the different process instances may be configured and/or assigned to retrieve and process different target data partitions (e.g., by receiving unique combinations of parameter values), the different target data for multiple process instances may reside in the same data table(s) within a database server, application-level cache, etc. In fact, the data partitioning described herein need not require the creation or modification of any existing storage structures, but may be performed entirely in real-time by process instances which retrieve and process separate portions of a data set. In other examples, individual process instances may create additional data structures (e.g., temp tables) to copy and store their respective data partitions during processing, after which the temporary data structures may be deleted.

In some embodiments, the process instances described herein may be created at the application-level (e.g., by the application itself and/or a partition scheduler or partition manager), rather than by a data store server or system-level server, so that the application may provide each process instance with the necessary context to retrieve and process its respective target data from the data tables in the back-end storage. For example, as described below, the data partitioning described herein may be performed by using partition schedules to create multiples process instances with run-time data values corresponding to unique sets of process parameters for each process instance. The data partitioning also may include creating partition schedules for applications based on sets of process parameters, determining sets of values of partition parameter from either application tables or application classes, and executing partition schedules by creating and launching the multiple parallel processes.

In order to perform these features and other functionality described herein, each of the components shown in the example system 400 may correspond to a single computer server or a complex computing system including a combination of computing devices, storage devices, network components, etc. Further, each of these components and their respective subcomponents may be implemented in hardware, software, or a combination thereof, including some or all of the components discussed above in reference to FIGS. 1-3. As shown in FIG. 4, the computing environment 400 may include multiple separate computing systems and layers, such as one or more application servers 410 configured to execute software applications, one or more separate partition servers 420 (and/or other middle-tier servers) configured to execute partition managers 425 and partition schedulers 435, one or more system servers configured to execute the process manager 440, and/or database servers configured to implement application data stores 450. In such examples, the separate computing systems or layers may correspond to separate implementations of hardware, software, and networking components, which may be operated at separate physical locations and/or by separate entities. However, in some embodiments, the various computing devices and/or servers 405, 410, 420, 425, 430, 435, 440, and/or 450 may correspond to a single integrated computing system with dedicated hardware and/or software that operates at the same physical location and under the control of a single entity. In such examples, communications networks may be optional, or may be an intranet or LAN rather than the various WAN computer networks or other communication networks that may be used in other embodiments.

In some cases, system 400 may be built and maintained by an enterprise or other organization, such as an educational institution or governmental entity, to provide services to users such as customers, employees, students, or other organization members. Accordingly, system 400 may be implemented as a multi-tier computer architecture, which may include web-based and/or cloud-based implementations, and in which client devices 405 are provided data and services via application servers 410 and/or middle-tier servers 420 which are executed upon an underlying set of hardware and/or software resources.

As shown in example system 400, users may interact with applications 411 via client terminal devices 405 such as desktop and laptop computer, mobile devices, etc. Specific examples of applications 411 may include data-intensive applications such as enterprise resource planning (ERP) applications (e.g., payroll systems, account systems, procurement systems, manufacturing systems, distributions systems, etc.), data mining applications, document management applications, customer relationship management (CRM) applications, e-Commerce applications, and the like. As discussed below in more detail, many applications 411 may initiate data processing tasks to be performed using data retrieved from one or more application data stores 450. In some embodiments, application data stores 450 may reside on application servers 410, while in other cases application data stores 450 may reside on separate database servers and/or other external systems.

System 400 also includes a partition manager 425, partition data store 430, partition scheduler 435, and process manager 440. As discussed below in more detail, partition manager 425 may provide one or more interfaces (e.g., APIs, command line or graphical user interfaces, etc.) through which client devices 405 may access the partition data store 430 and the partition scheduler 435 to define, create, and execute partition schedules for various applications 411. The partition data store 430 may be implemented, for example, on or more application servers or database servers, and may be configured to store definitions of partitionable parameters, application classes, partition schedules, and/or status data received from process instances during execution. Partition scheduler 435, discussed below in more detail, may coordinate execution of partition schedules by retrieving the partition schedules from the partition data store 430, determining numbers of process instances to be created for a data processing task, and determining the process parameters for each process instance. Process manager 440 may be configured to instantiate, monitor, and control new process instances, clean-up after complete process instances, and handle errors/failures within process instances. As shown in this example, the partition manager 425, partition data store 430, and partition scheduler 435 may be implemented on a partition server 420. However, in other examples, one or more of these components may be implemented separately by dedicated servers, or using other various combinations of hardware, software, and/or network components. Additionally, in various embodiments, the process manager 440 may be implemented on a separate server (e.g., a system server or application server 410), or on the same systems/servers as the partition manager 425 and/or partition scheduler 435.

Figure 5:
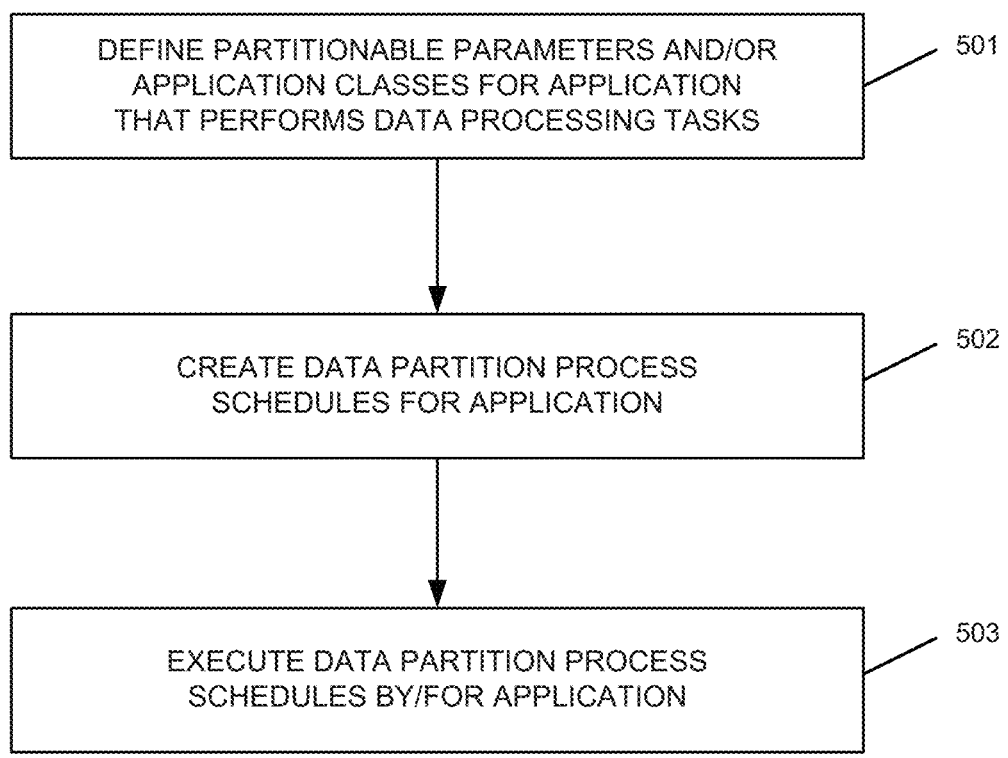
FIG. 5 is a flowchart illustrating a process for creating and executing data partition process schedules, according to one or more embodiments of the present invention.

FIG. 5 is a flow diagram illustrating, at a high-level, a process of creating and executing data partition process schedules (which also may be referred to as partition schedules). As described below, in various embodiments the steps in this process may be performed by one or more computing devices and/or components of a system 400 for scheduling and managing data partition processes, such as client devices 405, application servers 410, partition managers 425, partition schedulers 435, and/or process managers 440. However, it should be understood that the processes of creating and executing partition schedules need not be limited to the specific systems and hardware implementations described above in FIGS. 1-4, but may be performed within other computing environments comprising other combinations of the hardware and software components described herein.

In step 501, one or more sets of partitionable parameters and/or application classes may be defined for an application 411. As discussed above, various applications 411 may be programmed to perform data processing tasks on large amounts of data within one or more application data stores 450. For example, an enterprise application 411 may be configured to perform data-intensive processing tasks such as payroll processing, order processing, inventory auditing, and the like. Other applications 411 such as data mining applications 411, document management applications 411, customer relationship management (CRM) applications 411, e-Commerce applications 411, and the like may be configured to perform various other types of data processing tasks involving large quantities of data and/or data-intensive analyses. Such tasks may be executed according to a predetermined schedule defined by the user or the system, or may be executed on-demand in response to a user request. Each application 411 may perform processing tasks on data sets stored in one or more data tables (or other storage structures) within one or more data stores 450. As used herein, a data set for a processing task performed by an application 411 may refer to the entire collection of data to be processed during one execution of the data processing task. Due to the multi-user, continuous, and dynamic nature of the systems 400 and applications 411, the application data within the underlying data stores 450 may change frequently and continuously. Additionally, the same application data potentially may be accessed, modified, and/or deleted by other applications 411 with the system 400. Therefore, the data set for a processing task performed by an application 411 may be a dynamic and constantly changing data set which may be different each time the processing task is executed.

The techniques described herein include creating and executing data partition process schedules, or partition schedules, in which a number of different process instances are created and each assigned a subset of data to process for the application 411. Specifically, partition schedules may be used to determine a number of process instances to be created, and each process instance may be assigned a unique set of run-time data values corresponding to a unique set of parameters within the data set to be processed by the application. Accordingly, the partitionable parameters and/or application classes defined in step 501 may identify which possible parameters may be used to partition the data set, as well as the different possible subsets of values or other conditions to limit the data set.

In some cases, the partitionable parameters defined in step 501 may correspond to one or more data fields (e.g., columns within data tables) within an application's 411 data set. For example, in a payroll processing application 411, if the partitionable parameters are defined as a country field, state field, and office location field, then users creating partition schedules (in step 502) may have the option to partition the application's 411 data set based on any or all of those data fields. As another example, in an order processing application 411, if the partitionable parameters are defined as a business unit identifier and a vendor identifier, then users creating partition schedules (in step 502) may have the option to partition the application's 411 data set based on one or both of those data fields. In some cases, any data field within a data set may be used as a partitionable parameter. In other cases, only a limited number of parameters may be selected as partitionable parameters in step 501. For instance, for certain parameters that may have relatively few unique values within the data set (e.g., Boolean fields, uniform fields with constant values, etc.), or for parameters that may have many unique values within the data set (e.g., primary key fields, timestamps, text fields, and the like), it may be inefficient and/or cause high process overhead to use multiple parallel processes to partition the data based on these parameters. Therefore, in step 501, one or more of these types of parameters may be excluded from selection as partitionable parameters.

As illustrated in the above examples, defining partitionable parameters may include identifying data fields/columns within the data set to be processed by an application 411. However, the partitionable parameters may be defined in step 501 programmatically using application classes, which may be implemented as software applications, program extensions on applications 411, or various other types of software objects. In various different embodiments, application classes may be developed and built using various different programming languages and/or development environments. For example, application classes may be developed and deployed concurrently with specific applications 411 by application developers. Alternatively, some application classes may be designed, developed, and deployed (e.g., by customers or users) after the release of an application 411, in order to customize the application 411 for the specific systems 400 of the customer or user. In some cases, an application 411 may support one or more programmatic interfaces (e.g., APIs, interactive user interfaces, command line interfaces, etc.) to allow users to create application classes as program extensions for the application 411.

Within an application class, programming code may define a set of partitionable parameters along with value subsets or ranges for one or more of the parameters. For example, if country and business unit are partitionable parameters for a payroll processing application 411, then an application class may identify these parameters and define the specific values or range of values for each parameter. An application class in this case may include code limiting the country parameter to a specific number of countries or a geographic region, and/or code limiting the business unit parameter to a specific subset of business units. The limits on parameter values encoded into application classes may limit or narrow the number of process instances created and the total amount of data processed. For instance, rather than creating one (or multiple) process instances for each unique country in the data set, the limitations on the country parameter values within an application class (e.g., listing a subset of countries or geographic region) will cause process instances to be created only for the unique countries within the data set that satisfy the limitations and conditions of the application class. Accordingly, multiple different application classes may be created for each application 411, for example, to encode different subsets of parameter values or value ranges (e.g., different geographic regions for a country parameter, different business unit values for the business unit parameter, etc.).

Application classes also may encode additional conditions, rather than only encoding subsets of parameter values or value ranges, which may affect the data to be processed and/or the number of process instances to be created. For example, application classes may implement additional programming logic such as date ranges for data processing tasks, rankings (e.g., top N or top N data items) for processing tasks, and other conditions that may narrow or limiting the amount of data that will be processed by the application 411.

In step 502, one or more data partition process schedules (or partition schedules) may be created for an application 411, based on one or more of the partitionable parameters and/or application classes defined in step 501. As discussed above, a partition schedule may represent a plan or set of instructions for partitioning a data set into multiple data subsets to be processed in parallel by multiple different process instances. In some embodiments, a partition manager 425 may provide various interfaces and underlying functionality to create partition schedules in step 502. For example, a partition manager 425 may receive requests and/or support various user interactions with client devices 405 to allow a partition schedule to be designed and then stored in a partition data store 430.

Figure 6A:
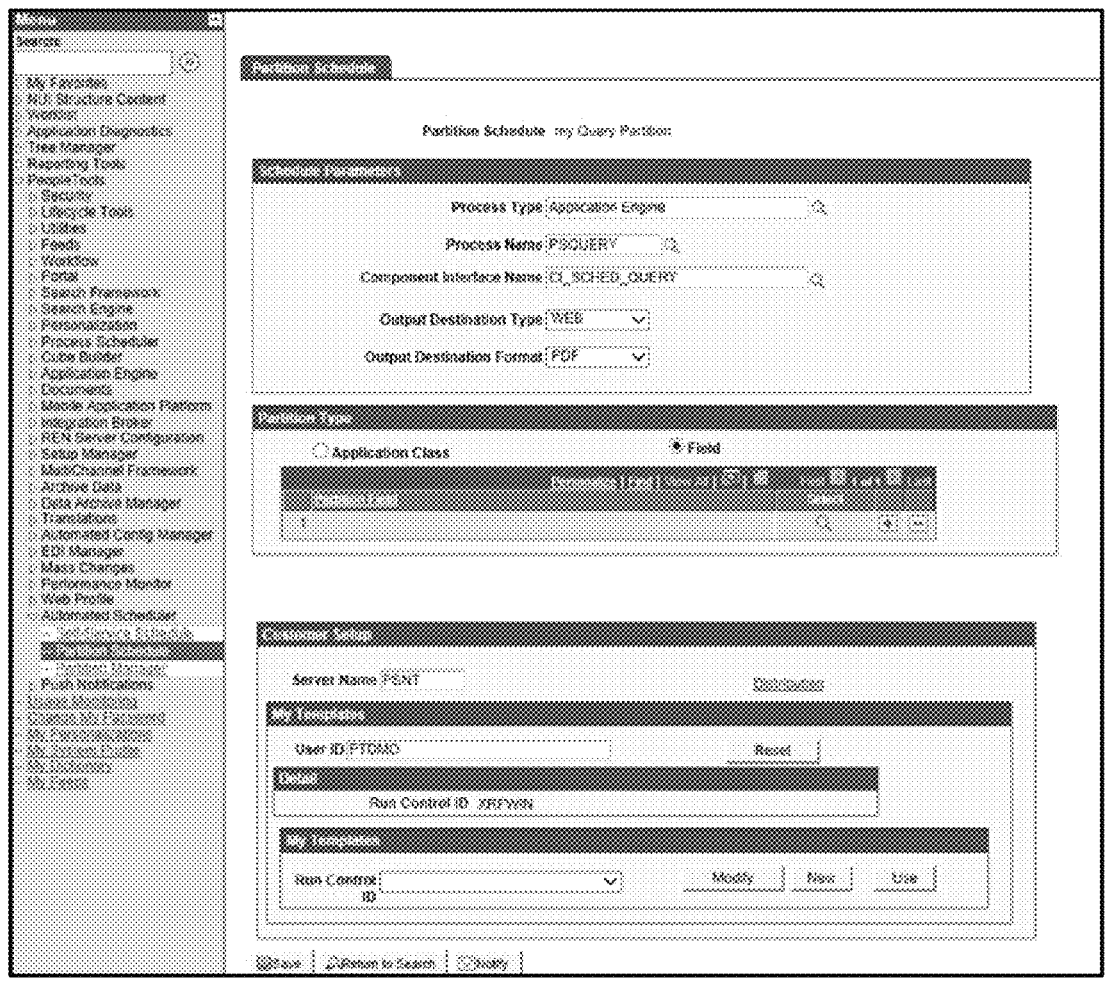
Figure 6B:
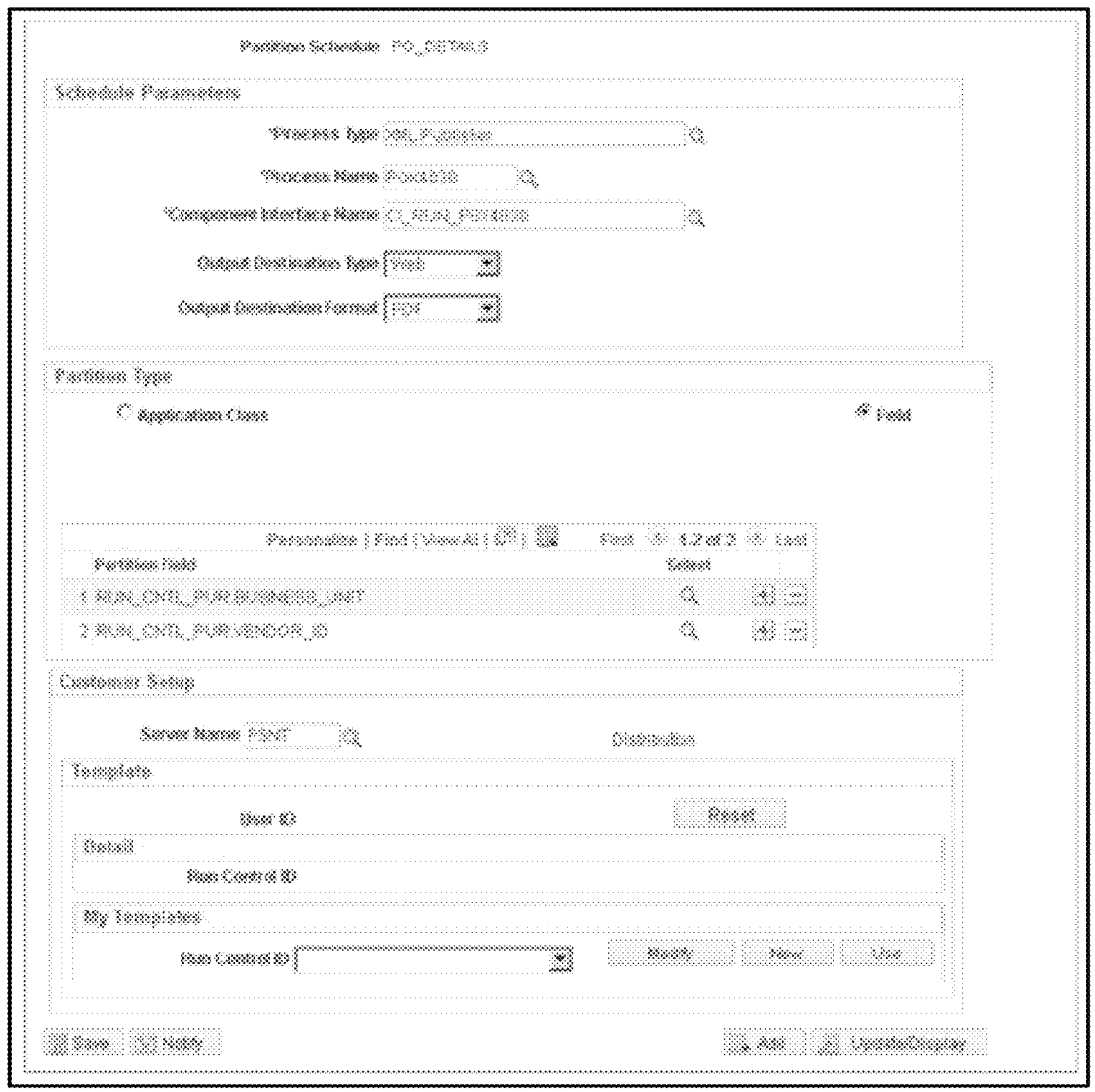
Figure 6C:
Figure 6D:
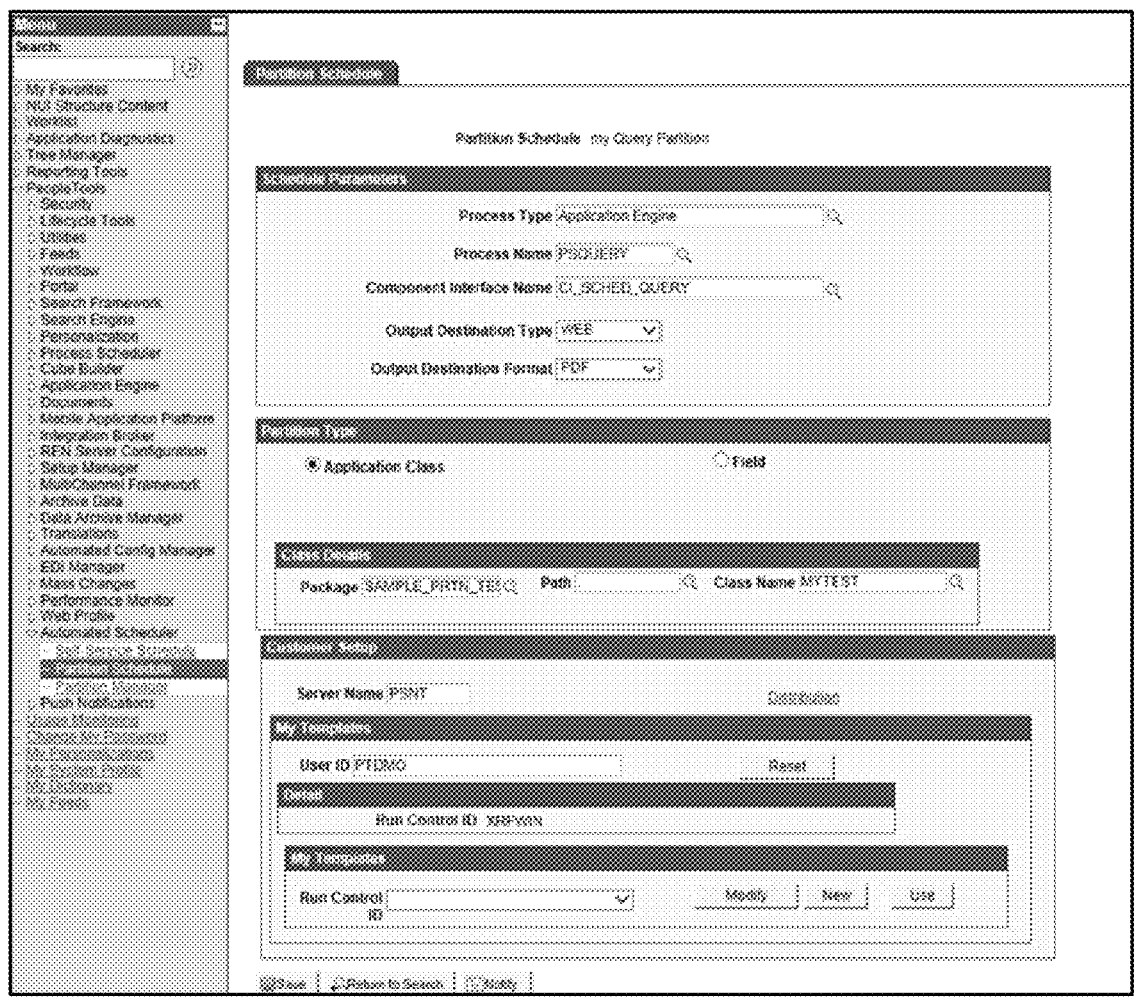

Referring briefly to FIGS. 6A-6G, several example screens (6A-6D) and related data structures (6E-6G) are shown of user interfaces generated by the partition manager 425 to allow users to create new partition schedules and modify existing partition schedules via client devices 405. In these examples, a partitioning schedule may be either a field-based partition schedule, as illustrated in FIGS. 6A-6C, or an application class-based partition schedule, as illustrated in FIG. 6D. FIG. 6E is an example of an application class pseudo-code implementing the partitioning logic. For either field-based partition schedules or application class-based partition schedules, the user interface allows selection of the parameters (e.g., partitioning fields or application class) to be used to perform the partitioning during subsequent execution of the data processing task by the application 411. For field-based partition schedules, the user may select one or more of the individual parameters defined in step 501, as shown in field-selection user interface in FIG. 6C. For application class-based partition schedules, the user may select any application class created in step 501 for the application 411. As illustrated in these examples, other parameters also may be defined using the interfaces provided by the partition manager 425, such as the process type, process name, component interface name, output destination types, and output destination format, that may be used with executing the partition schedule. Additionally, users may input a server name and template (if applicable). As a whole, the information received in step 502 via the users interfaces may fully define of a partition schedule. Additionally, although graphical user interfaces are used in these examples, it should be understood that programmatic interfaces (e.g., APIs) or command line tools may be used to provide the partition schedule definition information to the partition manager 425 in other examples.

FIG. 6F and 6G are example data structure definitions for a partition schedule data structures and a partition manager process table, respectively. As shown in FIG. 6F, the partition schedule definition metadata table shown in this example may include three records (e.g., PTPRTNSCHDL, PRPRTNSETUP, and PTPRTNCUSTSETUP), each containing a number of different fields. As shown in FIG. 6G, the partition manager process table shown in this example also may include three records (e.g., PTPRTNSCHDL, PTPRTNPRCSTBL, and PTPRTNINSTBL). The example partition schedule data structure definitions shown in FIG. 6F includes various fields or controls (e.g., metadata parameters) including partitioning application class details which may be used to provide filter/partition data to create the process instances. For instance, in this example the Process Type field/control may contain the process type for each database and operating system platform on which the process instances should run. The Process Name field/control may contain the process name to be displayed, and may be available are based on the type selected. The Component Interface Name field/control may contain the component interface on the run control for the process schedule, which may be created in an application designer if it does not exist. The Output Destination Type field/control may contain the output destination for the partition schedule that is applicable for the process type. The process instance may use the values in the process type definition to determine where to send the output. The Application Class field/control may contain a Boolean indicating whether or not this partition schedule is an application class-based partition schedule which includes an advanced partition mechanism that returns a list of partition values. The Field field/control may specify that the partitioning needed to be done on a field that has a pre-defined prompt table with the required values for the processes. The Server Name field/control may contain the server name on which this partition schedule should be to executed, and if this field is left blank, a default process scheduler server assignment may take place. The Distribution field/control may specify the distribution details, such as the users who would receive the process status notification with link to generated reports and other status information. The User ID field/control may contain the user associated with the selected run control ID. The Detail field/control may contain the selected run control ID to be used as a template for this partition schedule. The Run Control ID field/control may contain an existing run control ID.

After the information defining the partition schedule has been provided in step 502, the partition schedule definition may be saved and stored, for example, within a partition data store 430 on a partition server 420. In some embodiments, partition schedule may be stored as a file, metadata, XML object, or the like, which includes specific data needed to perform the data partitioning and processing task for the application 411. Additionally, as discussed above regarding the partitionable parameters and application classes, the partition manager 425 and/or partition data stores 430 may support the creation of multiple different partition schedules for each application 411. For instance, a first partition schedule may be executed to perform a specified data processing task using a certain partitioning scheme, while a second partition schedule may be executed to perform the same data processing task (and/or related tasks) using a different partitioning scheme.

In step 503, one or more of the partition schedules created and stored in step 502 may be retrieved and executed, for example, by the partition scheduler 435 and/or process manager 440. The processes and techniques involved in retrieving and executing partition schedules to perform data processing tasks for applications 411 are described in more detail below in reference to FIGS. 7-9. The execution of a partition schedule in step 503 may be initiated in accordance with data processing task schedule defined by users and/or administrators of applications 411. For example, applications 411 may have specific data processing tasks (e.g., payroll processing, order processing, inventory processing, data mining, system maintenance, auditing, etc.) which are configured to be executed on a recurring basis (e.g., hourly, daily, weekly, monthly, yearly, etc.) according to a schedule setup by a user or administrator. In other cases, applications 411 may support manual and on-demand initiation of data processing tasks, instead of or in addition to setting up predetermined schedules for the data processing tasks. As discussed below, in either case the determination by an application 411 to perform a data processing task may cause the corresponding partition schedule to be retrieved and executed by the partition scheduler 435 and/process manager in step 503. Accordingly, it should be understood that step 503 need not directly follow step 502 and need not be performed by the same components. To the contrary, a partition schedule may be created and stored in step 502 far in advance of the time that the partition schedule is ultimately retrieved and executed in step 503, and the execution of the partition schedule may be initiated and/or performed by an entirely different entities and components than those that created the partition schedule.

Figure 7:
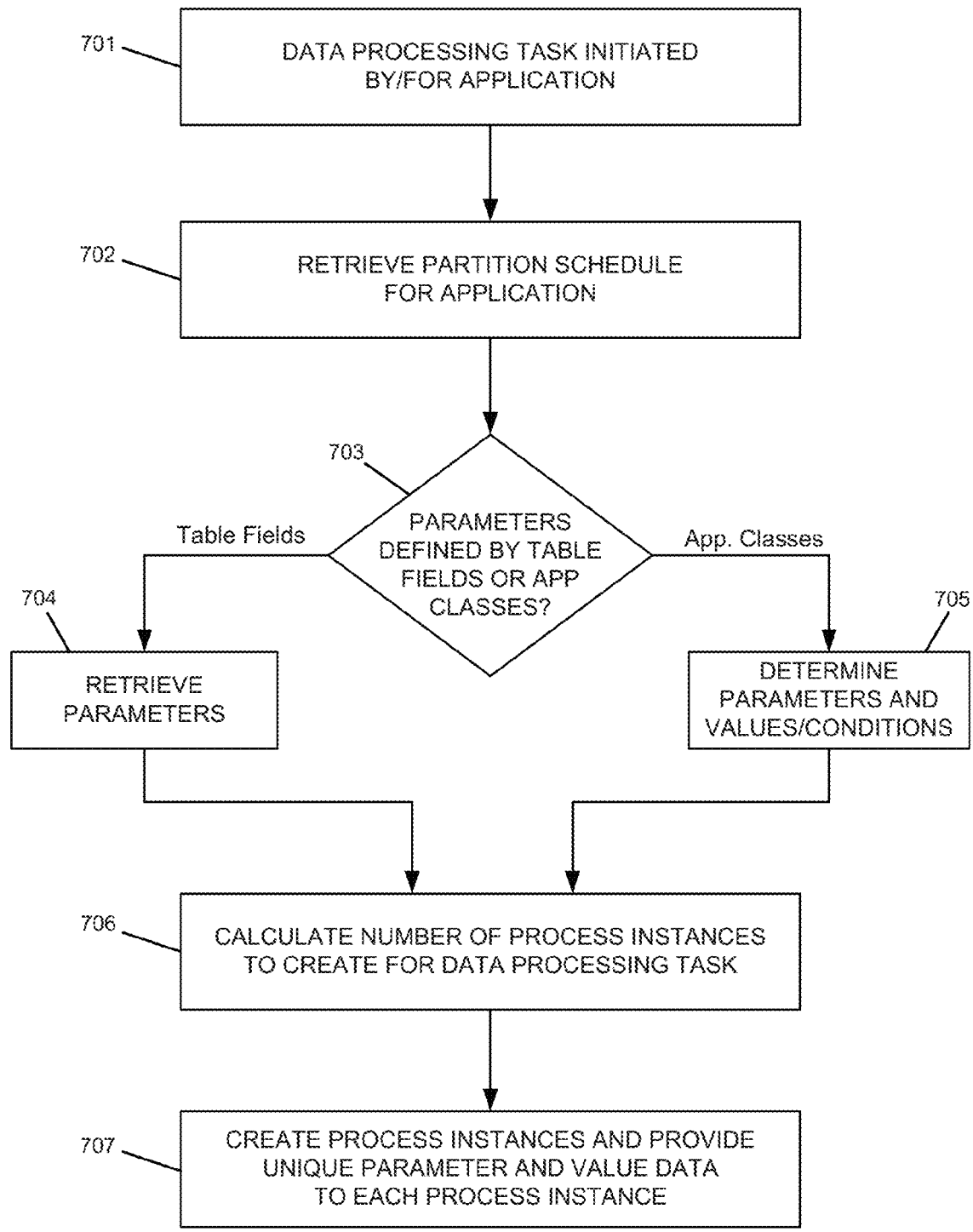
FIG. 7 is a flowchart illustrating a process for executing data partition process schedules, according to one or more embodiments of the present invention.

FIG. 7 is a flow diagram illustrating, at a high-level, a process of executing data partition process schedules (referred to as partition schedules) in order to perform a parallel data processing task for an application. As described below, in various embodiments the steps in this process may be performed by one or more computing devices and/or components of a data partitioning system 400, such as an application 411, partition scheduler 435, and/or process manager 440. However, it should be understood that the techniques and processes of executing partition schedules described herein need not be limited to the specific systems and hardware implementations described above in FIGS. 1-4, but may be performed within other computing environments comprising other combinations of the hardware and software components.

In step 701, a data processing task may be initiated by or for an application 411. As discussed above, application 411 may be any application configured to perform data processing tasks such as report generation, data mining and analysis, database modification, data auditing, and any other type of data processing tasks which may involve large quantities of data and/or data-intensive analyses. Accordingly, non-limiting examples of applications 411 may include enterprise resource planning (ERP) applications (e.g., payroll systems, account systems, procurement systems, manufacturing systems, distributions systems, etc.), data mining applications, document management applications, customer relationship management (CRM) applications, e-Commerce applications, and the like.

The initiation of a data processing task in step 701 may be caused by a user interaction directly with the application 411 (a so-called "on-demand" data processing task), or may be triggered based on a predetermined schedule of data processing tasks for the application. For example, a document management application 411 may be configured to automatically execute a daily document reporting process, a payroll application 411 may be configured to automatically execute a monthly payroll processing task, and so on. In some cases, the application 411 may initiate the data processing task by invoking an application programming interface (API) of the process scheduler 440. In other cases, the process scheduler 440 may be automatically triggered to initiate the process based on a schedule and/or based on the occurrence of specific event-conditions relevant to the application (e.g., data conditions, execution conditions, etc.).

In step 702, a partition schedule may be retrieved in response to the initiation of the data processing task in step 701. As discussed above in reference to step 502, partition schedules may be created and stored in a partition data store 430. Accordingly, in step 702, the partition scheduler 435 may receive a notification that a data processing task has been initiated (step 701), for example, from the process manager 440, the partition manager 425, or directly from the application 411. In response to such a notification, the partition scheduler 435 may retrieve the partition schedule corresponding to the data processing task from partition data store 430. As discussed above, partition schedules may be stored as metadata objects and/or files that identify the partitioning parameters, parameter values or value ranges, and/or other conditions to be used when partitioning the data for parallel processing by multiple process instances.

In some cases, multiple different partition schedules may be created and stored corresponding to a single data processing task. For example, for a particular payroll or order processing task (or any other specific data processing task), different partition schedules may be retrieved based on a user or application 411 that initiated the task, the time period during which the task was initiated, or based on the current conditions of the application 411 or application data, etc. In such cases, the partition scheduler 435 may determine which among multiple partition schedules to retrieve from the partition data store 430 in step 702. For instance, if a user with a first system authorization level requested the data processing task in step 701, the partition scheduler 435 may retrieve one partition schedule, whereas if a user with a different system authorization level requested the data processing task in step 701, the partition scheduler 435 may retrieve a different partition schedule for the data processing task. Similarly, if a client device 405 in a first geographic region initiated the data processing task in step 701, the partition scheduler 435 may retrieve one partition schedule, whereas if a client device 405 in a different geographic region initiated the data processing task in step 701, the partition scheduler 435 may retrieve a different partition schedule. The retrieval of a specific partition schedule in step 702 may be performed by the partition scheduler 435 based these and other user characteristics (e.g., user role, user organization, etc.), as well as other factors such as the current time, current system 400 status or load, current state of the application data store 450, etc.

In step 703, the partition scheduler 435 may initially analyze the partition schedule retrieved in step 702 to determine if the partition parameters for the schedule correspond to table fields or an application class. As discussed above, a partition schedule may define one or more parameters that may be used to partition the data for parallel processing of a data processing task. These partition parameters may correspond to one or more individual table fields (e.g., columns within data tables) or may be determined programmatically by an application class. If the partition schedule indicates (e.g., via the metadata of the partition schedule) that the partition parameters are individual table fields (703:Table Fields), then partition scheduler 435 may identify the parameters, which may be included or referenced directly within the partition schedule itself, in step 704. Alternatively, if the partition schedule refers to an application class (703:Application Class), then the partition scheduler 435 may access and execute the application class to determine the partition parameters in step 705. As discussed above, an application class may be implemented as a program extension that defines the partition parameters, the subset of values or value ranges for each parameter, and/or other conditions relating to the data partitioning and/or the number of process instances to be created.

In step 706, the partition scheduler 435 may calculate a number of process instances to be created based on the partition parameters determined in step 704 or 705. In some embodiments, the calculation in step 706 may be a calculation of the number of unique combinations of parameter values of the parameters determined in step 704 or 705, which may correspond to the cross-product of the parameter values. For instance, consider a scenario in which three parameters are determined based on an analysis of a partition schedule in step 704: a country parameter, a business unit parameter, and a vendor ID parameter. For the country parameter, the data store 450 may store X distinct values, each value representing a different country. For the business unit parameter, the data store may store Y distinct values, each value representing a different business unit. For the vendor ID parameter, the data store 450 may store Z distinct values, each value representing a different vendor.

Country Parameter Values (C)={C1, C2, C3, . . . , Cx}

Business Unit Parameter Values (B)={B1, B2, B3, . . . , By}

Vendor ID Parameter Values (V)={V1, V2, V3, . . . Vz}

In this example, the partition scheduler 435 may calculate the number of processes to create as the cross product of these three parameters, for instance, X*Y*Z.

However, in some cases, the application data store 450 might not contain a data record for every unique combination of parameter values. Thus, the calculation in step 706 may be less than the total cross product of the unique parameter values (e.g., X*Y*Z). To illustrate this distinction, refer briefly to application data table 850 shown in FIG. 8. Assuming the data records shown in table 850 are the entire data set for an application, the calculation of unique combinations of the business unit and vendor ID parameters would equal 5, even though the total product of the parameters would equal 9 (i.e., 3 distinct business units*3 distinct vendors), because not all of the possible business unit-vendor combinations are found in the current data set.

Any of the above scenarios may apply when a partition schedule defines a number of parameters by table fields, which may be determined in step 704. However, similar scenarios may be applied when a partition schedule identifies one or more application classes from which the parameters, value subsets or ranges, and/or other conditions may be determined in step 705. As discussed above, an application class may include software code and/or logical rules that identify which parameters should be used to partition the data, and also may define subsets or ranges of values for each parameter, as well as other conditions controlling the data partitioning and/or the number of process instances to be created. For instance, continuing the above example, an application class may identify the same three parameters discussed above, but may enforce a requirement that only the following subsets or ranges of values should be processed for each parameter:

Country Parameter Values (C)={C1-C5}

Business Unit Parameter Values (B)={B1, B4, B5, B12}

Vendor ID Parameter Values (V)={V1, V2, V3, . . . Vz}

Accordingly, in this example, the partition scheduler 435 may calculate the number of processes to create in step 706 as the cross product of these three parameters, taking into account the subsets or ranges defined by the application class in step 705. In this case, the number of processes calculated in step 706 may be 5*4*Z.

Furthermore, as discussed above, an application class may include additional programming code/logic to enforce other conditions which may affect the calculation of the number of processes in step 706. For example, when a partition schedule includes or refers to an application class, the calculation of the number of processes in step 706 may depend on additional factors such as the geographic region from which the data processing request in step 701 was initiated, or the authorization level, role, or organization of the user that initiated the data processing request in step 701, and/or other various factors such as the current time, current system status, processing load, data states, etc., associated with the application 411.

Regardless of whether the partition parameters are determined based on data fields/table field within a partition schedule (step 704) or determined programmatically based on an application class associated with a partition schedule (step 705), the calculation in step 706 may be dynamic in the sense that it may be performed subsequently and in response to the initiation of the data processing task in step 701. As a result, because the underlying application data stored in data store 450 may be constantly changing, the calculation in step 706 may yield a different result whenever the underlying application data changes. For instance, referring to the above example, if a new data record is added to the data store 450 having new values of the Country (C), Business Unit (B), and Vendor ID (V) parameters (or new unique combinations of the values for these parameters), then the next time the calculation in step 706 is performed the result may be greater by one to account for these new parameter values and/or new unique combinations of values. Similarly, after deleting or modifying data records in the application data store 450, if certain values of the C, B, and V parameters (or certain unique combinations of the values for these parameters) are no longer found among the current data records, then the next time the calculation in step 706 is performed the result may be lesser because these parameter values and/or unique combinations of parameter values are no longer present.

In step 707, a number of different processes (which also may be referred to as process instances) may be created corresponding to the number calculated in step 706. In some embodiments, the partition scheduler 435 may instruct the process manager 440 to create the calculated number of process instances. For example, as discussed below the partition manager 435 may insert a number of new data records into a run control table, and the process manager 440 may read the data records and create a new process for each record in the table.

Each new process instance created in step 707 also may be provided with a unique (i.e., unique with respect to the set of process instances) combination of parameter values that may be used by the process to retrieve a corresponding unique data partition from the application data store 450. For example, the partition scheduler 435 may use a recursive traversal algorithm to generate distinct sets of parameter values to provide as input for each different process. The algorithm may traverse across each of the parameter value sets for the different parameters, and construct new sets comprising of one element from each parameter value set, such that each constructed set of values is distinct. To illustrate such a process using the above example, assume that three parameters C, B, and V (e.g., Country, Business Unit, and Vendor ID), and/or any other partitionable parameters within the partition schedule) each have different numbers of values as follows:

set of C={C1, C2, C3, . . . , Cx} set of B={B1, B2, B3, . . . , By} set of V={V1, V2, V3, . . . Vz}

. . .

where x, y, and may be any number and there are multiple sets like C, B, and V.

In this case, the partition scheduler 435 may select distinct sets of parameter values by picking one value from each of the original sets of C, B, and V, as shown below:

{C1, B1, V1}

{C1, B1, V2}

. . .

{C1, B1, Vz}

{C1, B2, V1}

. . .

{C1, B2, V1}

. . .

{C2, B1, V1}

. . .

and so on, until the final combination of {Cx, By, Vz} is reached.

The algorithm used by the partition scheduler 435 (e.g., a recursive traversal algorithm) also may take into account that the different parameter value sets (e.g., C, B, and V) may be of different sizes, and that there may be any number of such sets. Additionally, in some cases, the distinct sets of values determined by the partition scheduler 435 in step 707 may correspond to subsets or ranges of parameter values defined by an application class, rather than including every distinct combination of parameter values {Cx, By, Vz}.

In some embodiments, the partition scheduler 435 may store the initial data sets in a two dimensional array, such that each array consists of the set of related values. For example, the data sets from the previous example may be stored in two-dimensional array TWODIM, as shown below:

set of N={N1, N2, N3, . . . , Nx} set of M={M1, M2, M3, . . . , My} set of L={L1, L2, . . . Lz}

TWODIM[1][1]=N1

TWODIM[1][2]=N2

TWODIM[2][1]=M1

. . .

and so on.

The partition scheduler 435 may calculate the total number of combinations possible, and number of values in each combination. As noted above, the total number of combinations may be the cross product of the size of each parameter value set. In the above example, if there are there parameter value sets (e.g., C, B, and V) of sizes 5, 6 and 8 respectively, then the total number of combination possible is 240 (i.e., 5*6*8), and number of parameter values in each combination is 3. Thus, the partition scheduler 435 may create a two-dimensional array of integers of size [240]*[3] (i.e., 240 rows each having 3 data values), and may generate indexes such that each index gives the position of the elements in the original data set, so that the partition scheduler 435 may know which element from the original data set needs to be obtained for each combination.

Figure 8:
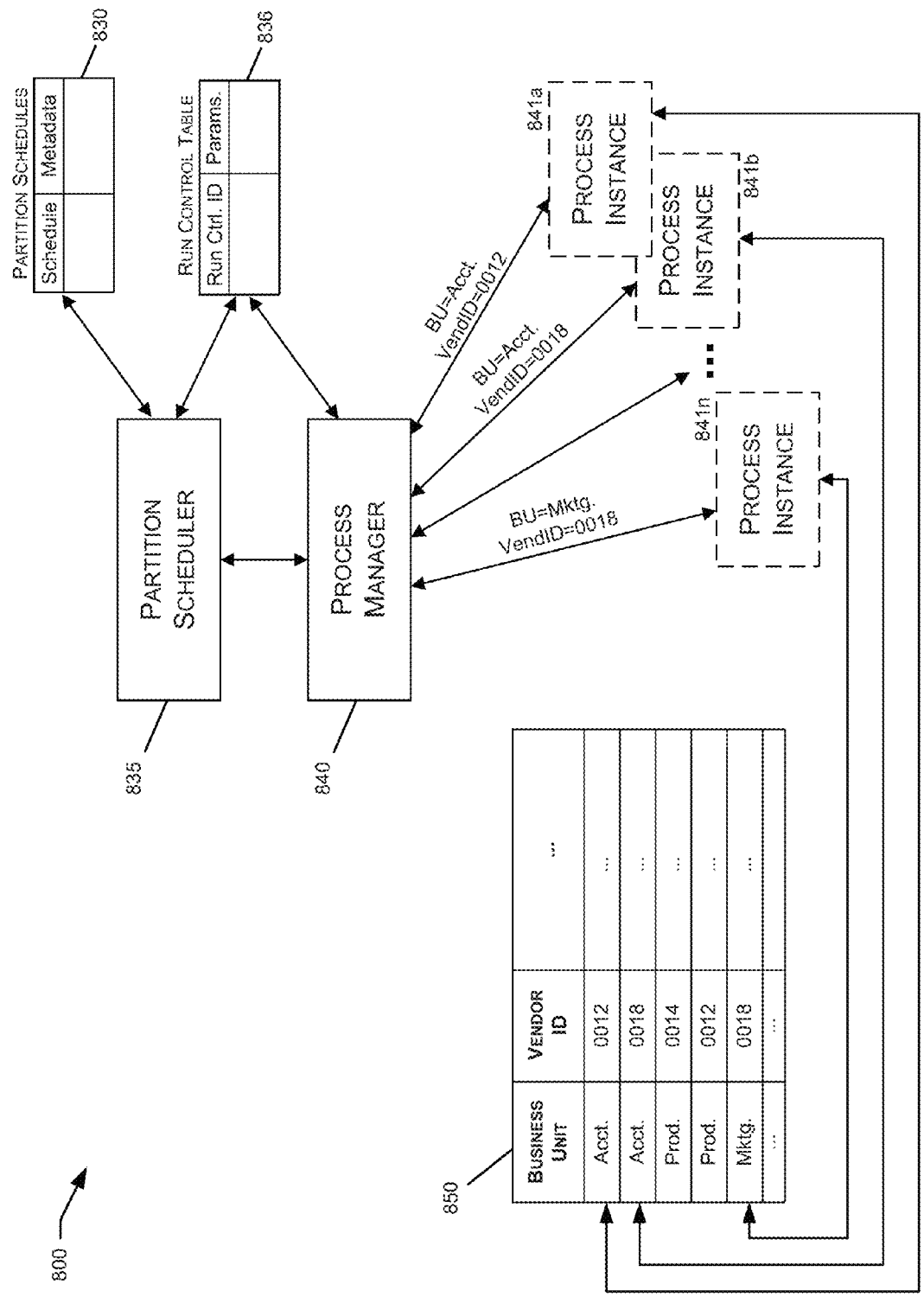
FIG. 8 is a block diagram illustrating certain components of a system for scheduling and managing data partition processes during execution of a data partition process schedule, according to one or more embodiments of the present invention.

After generating the unique combination of parameter values, each new process created in step 707 may be provided one of the unique combinations of parameter values. As illustrated in FIG. 8, each process may use its unique combination of parameter values to retrieve and process a separate partition of data within the application data store 450. The processes may operate independently and in parallel to retrieve and process separate slices of the data involved in the overall data processing task initiated by/for the application 411 in step 701. In some embodiments, the individual process instances may execute at the application level to perform data processing on target data that is either retrieved from an underlying data store or has been cached at the application layer.

Referring now to FIG. 8, a block diagram is shown illustrating components of a system for creating and managing process instances to perform parallel processing on an application data store in accordance with a partition schedule. System 800 shown in this example may be similar or identical to the system 400 used for creating, executing, and managing partition processes, discussed above. In this example, system 800 includes a partition scheduler 835 and a process manager 840 which may correspond to the partition scheduler 435 and process manager 440 discussed above in reference to FIG. 4. The computing environment 800 may also include various additional systems not shown in FIG. 8, such as client devices, application servers, a partition manager, and application data stores similar to those discussed above. FIG. 8 also shows an example application data table 850 that may reside in an application data store 450, an example partition schedule table 830 that may reside in a partition data store 425, an example run control table 836, and multiple process instances 841 that have been created to perform parallel processing on separate data records within the example table 850.

In this example, system 800 is shown performing an illustrative data processing task using data partitioning and multiple parallel process instances, such as discussed above in FIG. 7. For instance, after a data processing task has been initiated by or for an application 411, a corresponding partition schedule may be retrieved from a partition schedule table 830. In this case, the partition schedule table 830 includes a schedule identifier along with the metadata of the partition schedule.

After retrieving the partition schedule from table 850, the partition scheduler 835 may analyze and/or execute the partition schedule as described above in steps 702-707 to determine the number of process instances to create, and the unique sets of parameter values to provide to each process instance. In this case, the partition scheduler 835 may insert a data record into the run control table 836 for each process instances to be created. Each record added to the run control table 836 may include a run control identifier and a set of parameters corresponding to a unique set of parameter values determined for the process in step 707. The process manager 840 may retrieve the records from the run control table 836 and create a new process instance 841 for each record. The process manager 840 also may provide the unique parameter sets to each new process instance 841, either during or after the creation of the process instance 841. As shown in this example, a multiple process instances 841a-841n have been created by the process manager, and each process instance 841 has been provided with a unique combination of the business unit and vendor ID parameters.

As shown in FIG. 8, each of the multiple process instances 841 may retrieve and process a portion of the data records from application data table 850, based on the unique set of parameters provided to the process instance 840. Therefore, the process instances 841 may collectively perform data partitioning/filtering and parallel processing of the entire set of application data to be processed for the application 411. In some cases, process instances 841 may be identical copies and may execute identical code bases, and thus the only execution differences between the processes 841 may be the result of the different parameter sets provided to the each process instance. Each process instance 841 may execute independently, using the available resources for computing, network communication, storage, etc., from the computing environment 800. In some cases, the individual process instances 841 may execute at the application level, and may perform the programmed data processing functions on their respective target data partitions, which may either be retrieved from the underlying data store (e.g., data store 450) in a database layer, or may be retrieved from a cache in the application layer. Some process instances 841 may retrieve their respective partitions of the application data and create temp tables to store their partitions during processing, while in other cases the process instances 841 may retrieve and process their data partitions without creating temp tables.

In some embodiments, process instances 841 may be created having a child-parent relationship to the partition scheduler 835 and/or other processes used to control and monitor the execution of the process instances 841. In such cases, process instances 841 may be configured to transmit data processing status messages to the partition scheduler 835 (e.g., directly or via the process manger 840) or to another monitoring process. The messages transmitted from a process instance 841 may indicate the progress of the process 841 while processing its data partition, may indicate when its processing has been completed and/or the results of the data processing on its data partition, and/or may indicate runtime errors or other failures during the processing.

The process scheduler 835 and/or other parent processes which may be configured to monitor and control the process instances 841, also may provide various interfaces to allow users at client devices 405 to monitor and control the execution of overall data processing tasks for applications 411 in general, and specifically to monitor and control the individual process instances 841 that have been created to partition and process the data in parallel. For example, the partition scheduler 835 may receive messages from process instances 841 and then communicate the process status data with a partition manager 425 which provide access to the status data to client devices 450 via one or more interfaces. Similarly, interfaces provided by a partition manager 425 may allow users to control specific process instances 841 by canceling, re-executing, and the like, as shown in FIGS. 9A-9K.

Referring now to FIGS. 9A-9K, several example screens are shown of user interfaces generated by a partition manager 425 (and/or partition scheduler 825) to allow users to monitor and control the execution of partition schedules as a whole, including individual process instances 841. As discussed below, a partition manager 425 may provide one or more user interface pages to allow users to manage the creation and execution of partition schedules. Such interfaces may provide functionality to execute and archive schedules, and also to allow Re-Run, Update, and Delete of partitioned processes. Additionally, although graphical user interfaces are used in these examples, it should be understood that programmatic interfaces (e.g., APIs) and/or command line tools also may be used to allow client devices 405 to similarly monitor and control the execution of partition schedules.

Figure 9A:
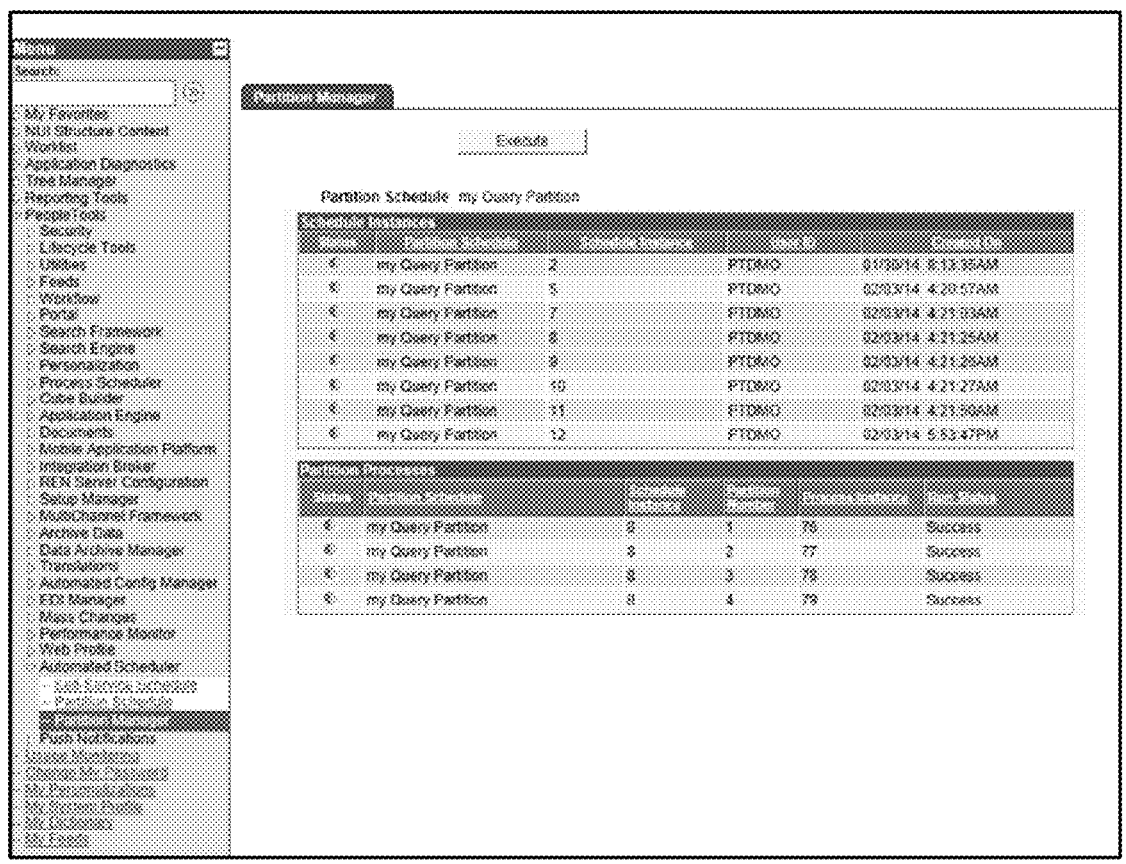
Figure 9B:
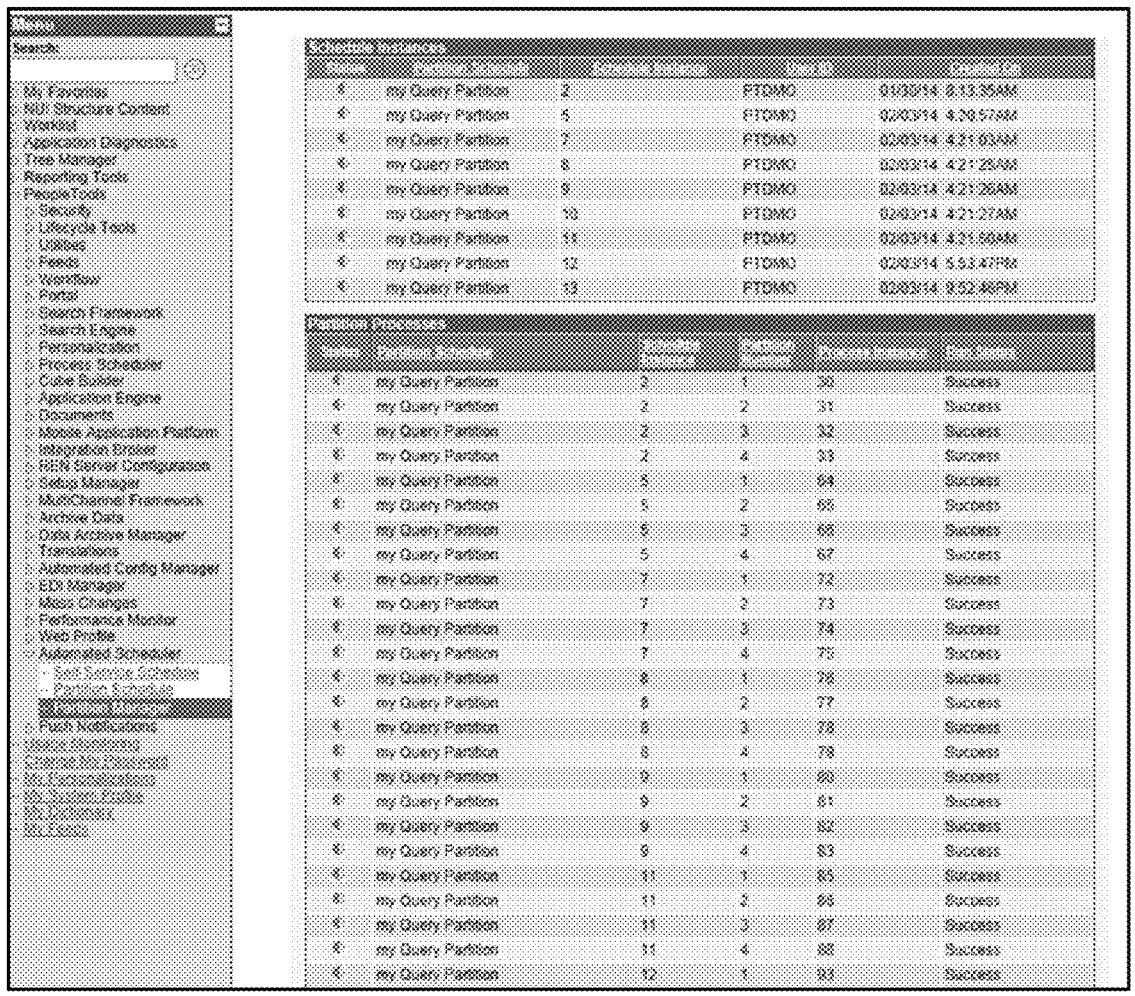

In this example, a first interface screen may correspond to a partition manager page (e.g., provided by a partition manager 425) that provides functionality to retrieve and execute partition schedules. The first step may be receiving search criteria for a partition schedule, identifying a partition schedule based on the search criteria and opening it, which may open the partition schedule in the partition manager page, as shown in FIG. 9A for the example "my Query Partition" partition schedule. As shown in FIG. 9A, the partition manager page may list the schedule instances of that particular partition schedule. To create a new instance of the partition Schedule, the user may selected the "Execute" button, after which a new instance (e.g., Schedule Instance: 13) may be created as described as described above in reference to steps 701-707. After creation of a new schedule instance, the user interface may be automatically updated to shown the new schedule instance, as illustrated in FIG. 9B. In some cases, the automatic update may be implemented with a server side push enabled or configured.

Figure 9C:
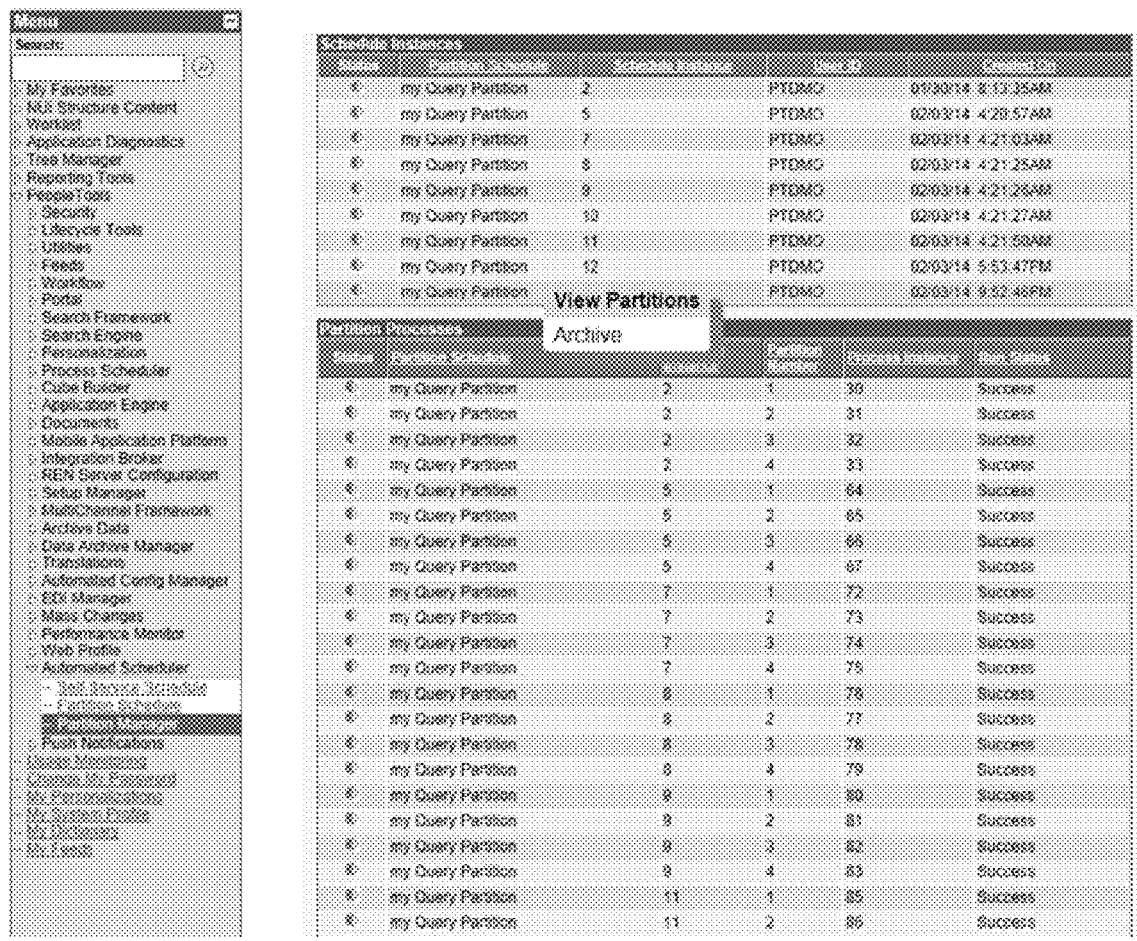
Figure 9D:
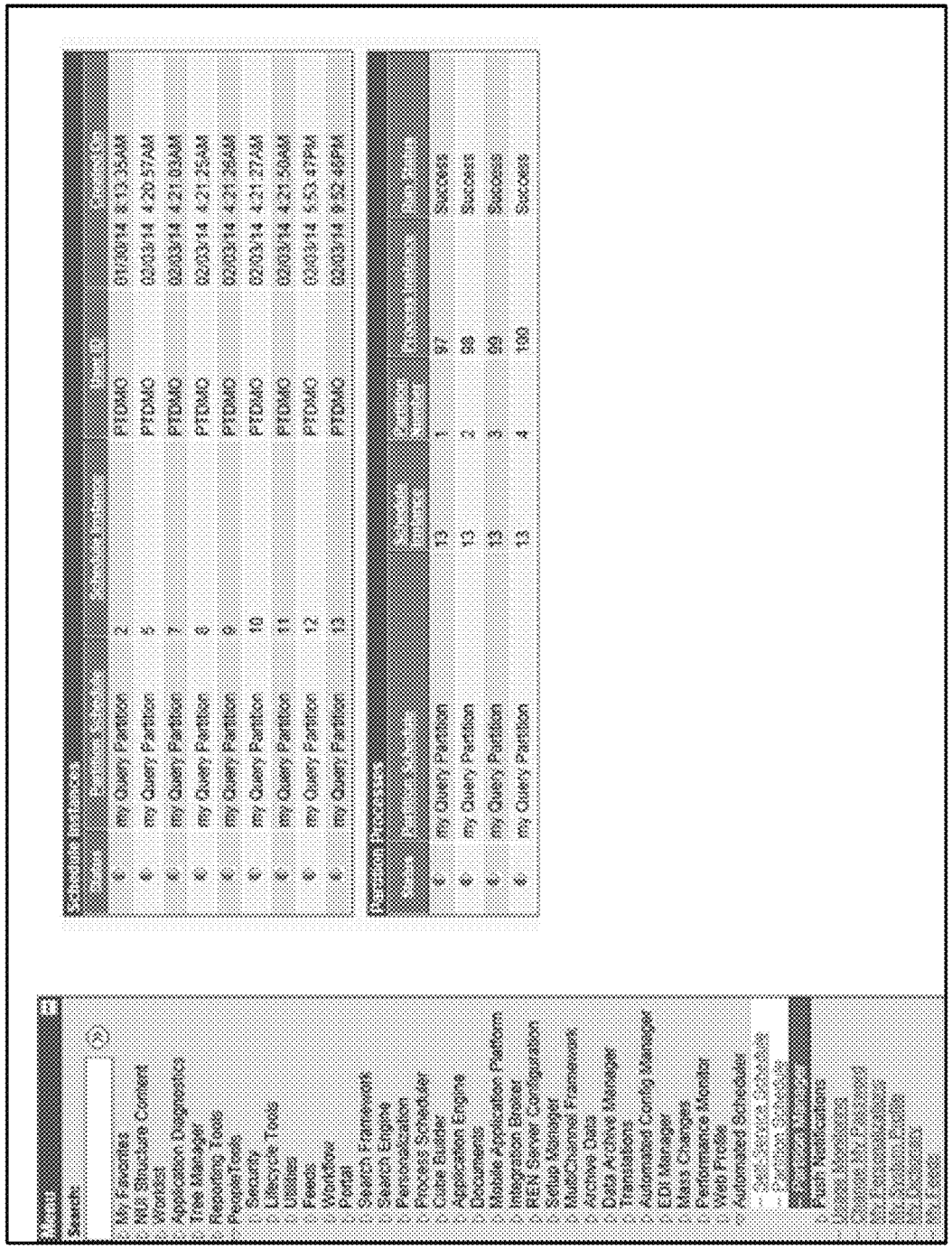
Figure 9E:
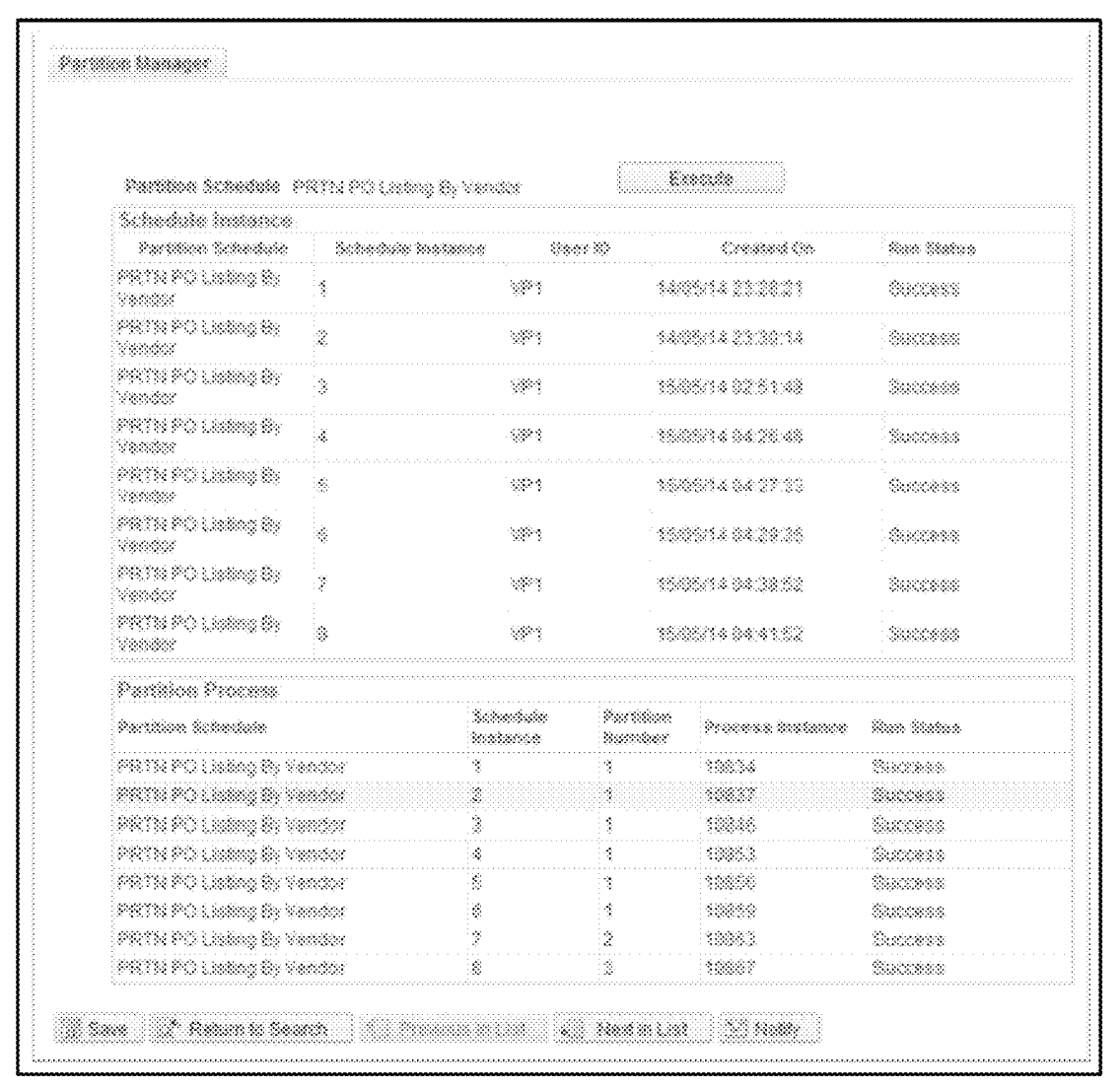
Figure 9F:
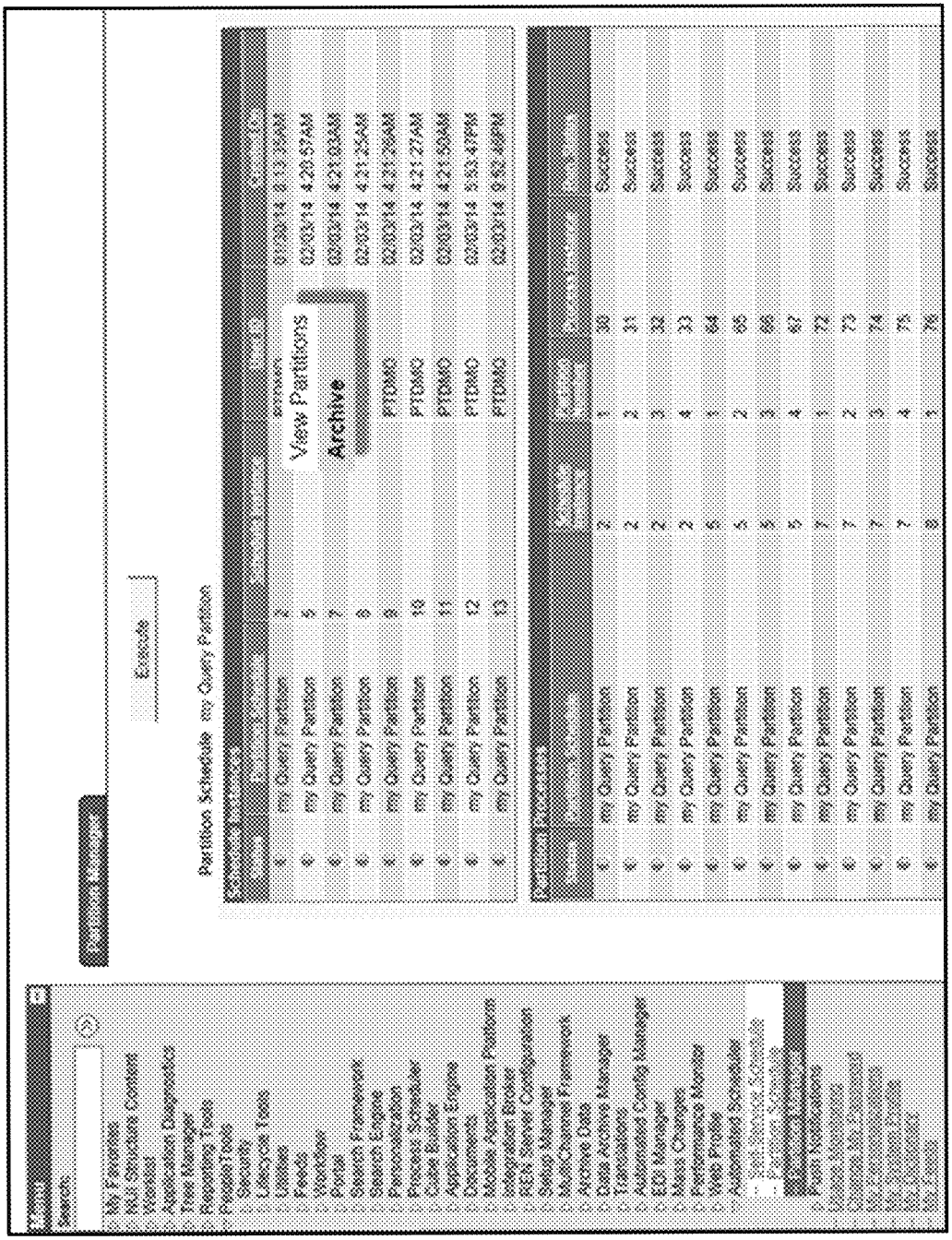
Figure 9G:
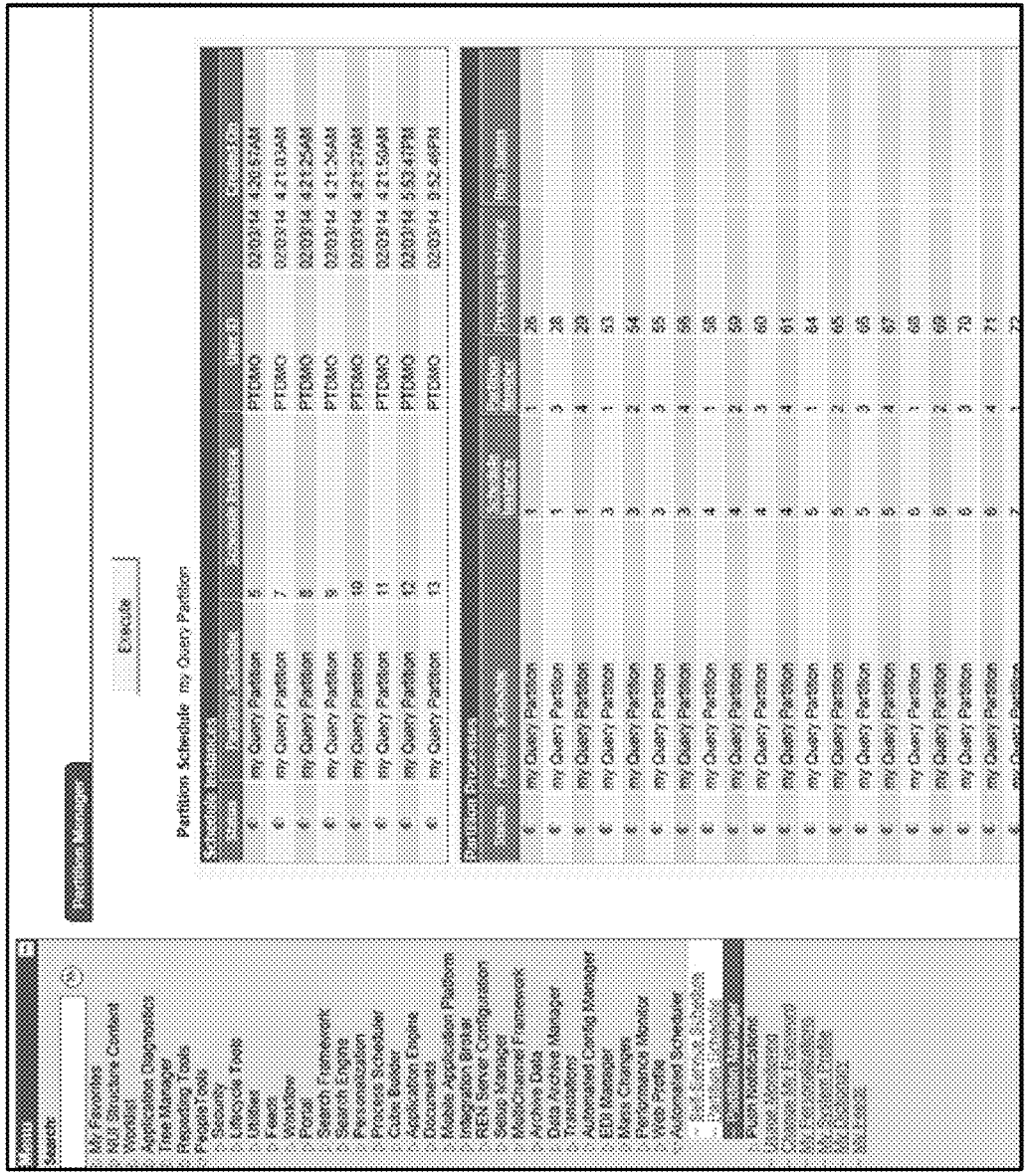

To view the partition processes (e.g., process instances) corresponding to any of the schedule instance, a user may select a schedule instance row. In some cases, a context menu may be presented on the screen and the user can select a "View Partitions" item from the menu as shown in FIG. 9C. After the selection, the process instances specific to the particular schedule instance may be displayed in a partition process window, as shown in FIG. 9D for schedule instance 13 of the example partition schedule "my Query Partition." Alternatively and additionally, the process instances for all current partition schedules may be shown in a partition process window, as shown in FIGS. 9B and 9E for example. In some embodiments, schedule instances that are no longer being actively monitored may be archived by selecting an "Archive" menu option, as illustrated in FIG. 9F. This selection may archive the schedule instance and remove it from the schedule instance window. As shown in FIG. 9G, the archived schedule instance 2 for the example partition schedule "my Query Partition" has been removed from the schedule instances window, and its process instances have been removed from the partition processes window.

Figure 9H:
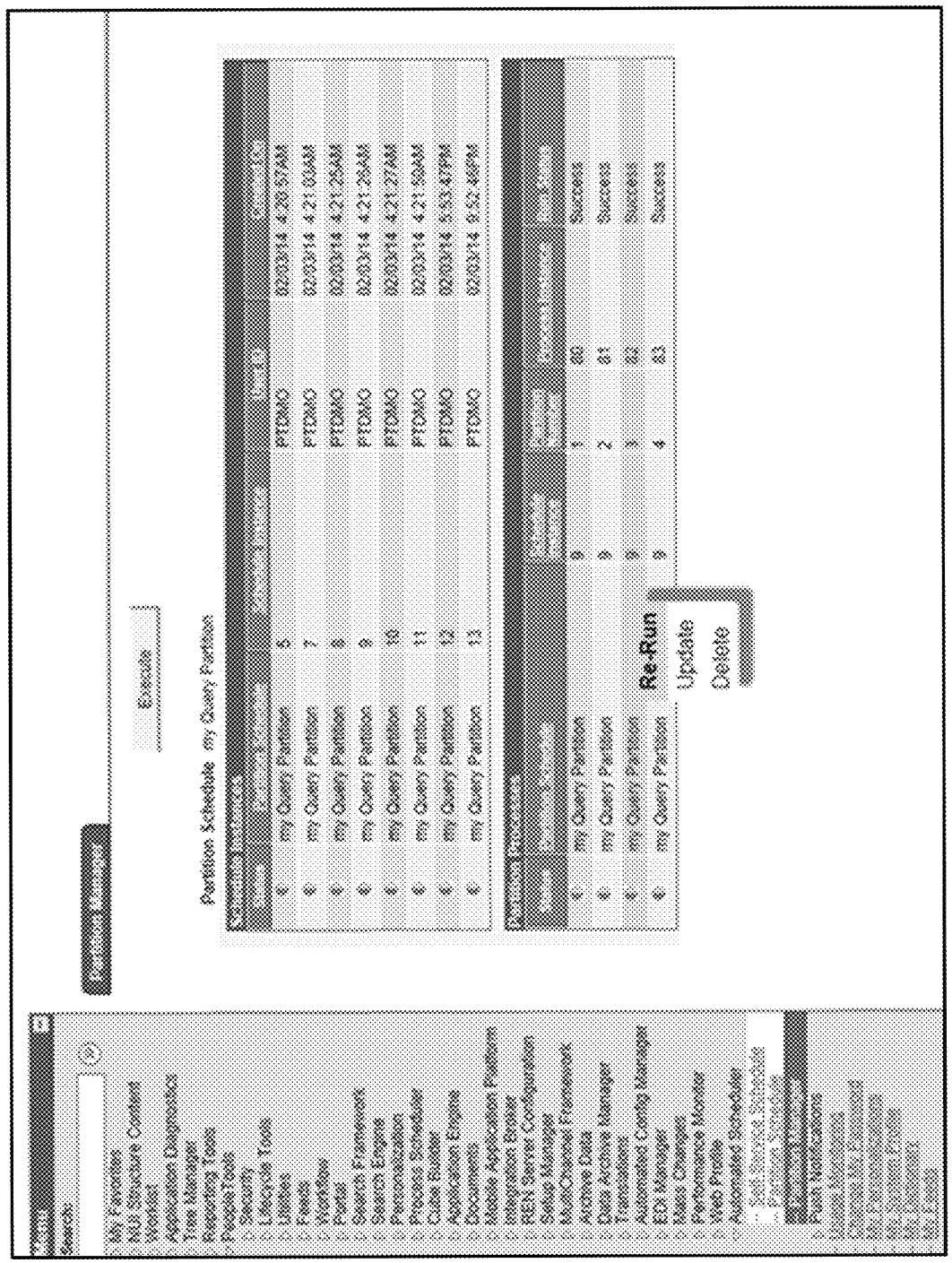

As illustrated in FIG. 9H, a re-run option and corresponding functionality may be provided in some embodiments, which may create a new process instance identical to the selected partitioned process instance. This feature may be useful, for example, when a particular process instance 841 has generated an error and needs to be re-run. The process instance being re-run may use the same run-control, and hence all the run control parameters may be re-used.

Figure 9I:
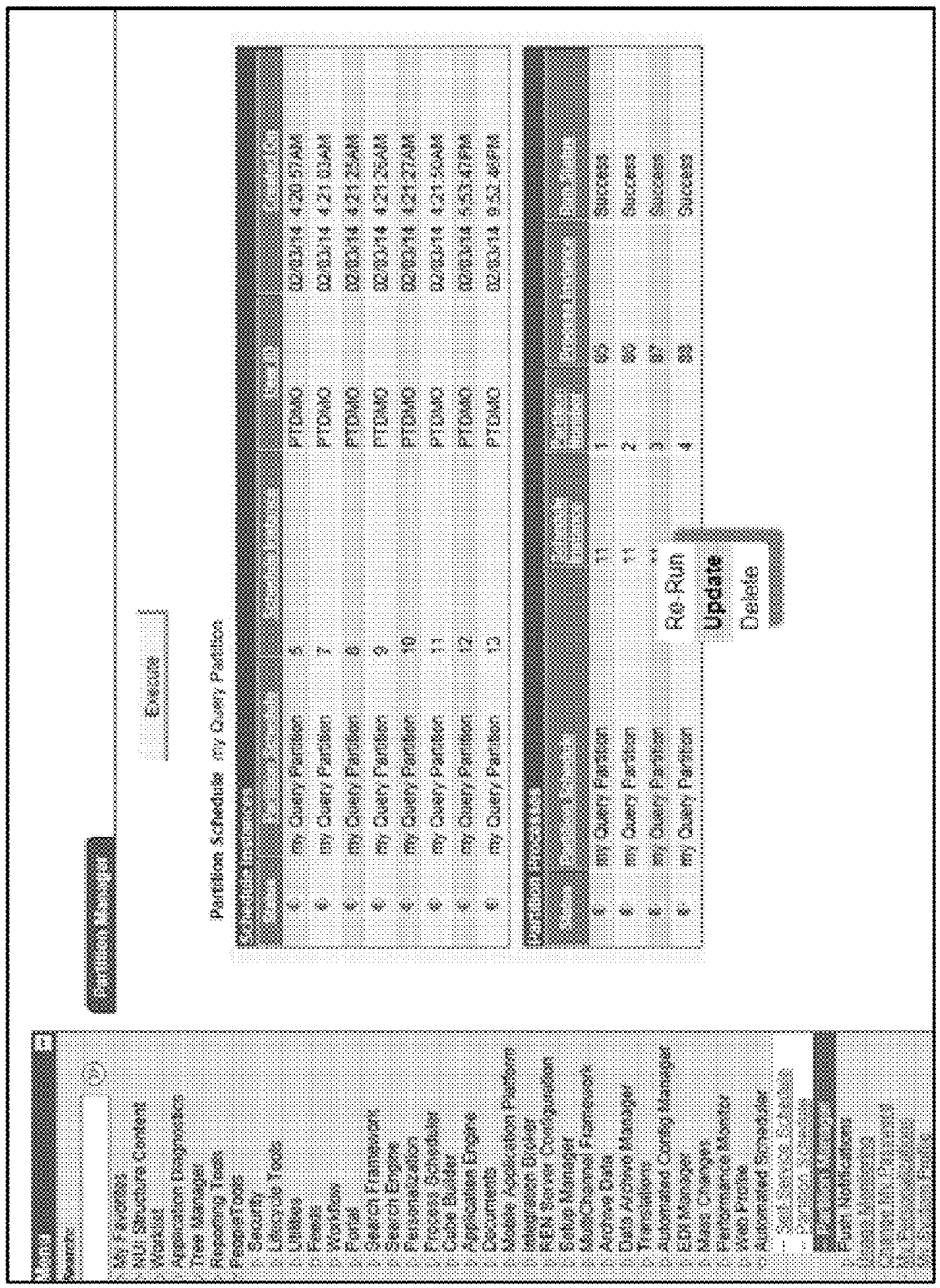
Figure 9J:
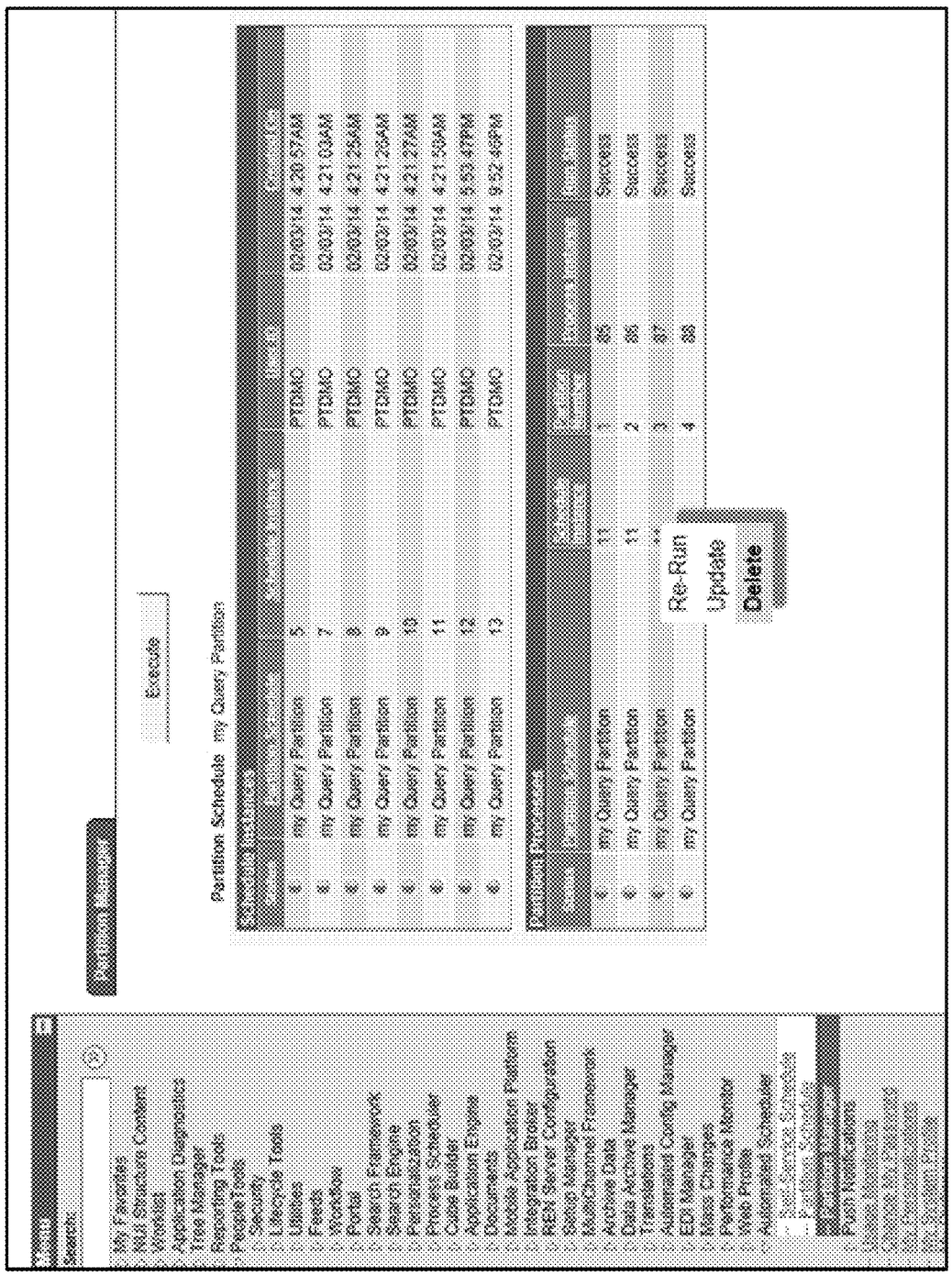
Figure 9K:
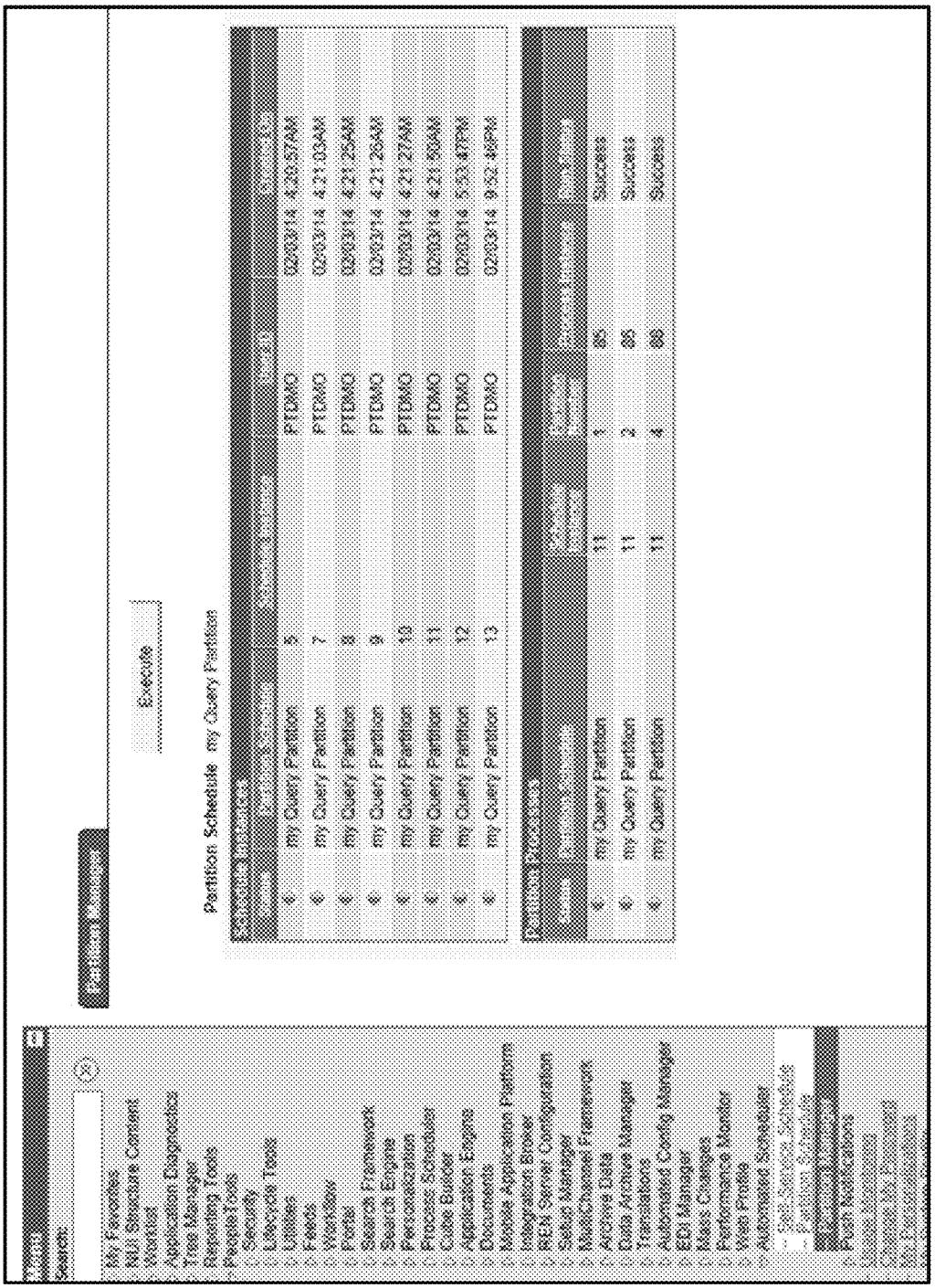

As illustrated in FIG. 9I, an update option and corresponding functionality may allow the run-control to be edited and saved. This feature may be useful, for example, when a process instance has generated an error due to wrong data in the run control page, which may need to be corrected before re-running the process instance. As illustrated in FIG. 9J, a delete option and the corresponding functionality may be provided to remove a process instance from the schedule instance. This feature may be useful, for example, when a particular process instance is no longer useful for a schedule instance and/or is generating errors and blocking the success completion of the schedule instance, in which case the process instance may be deleted so that the status of the schedule instance may be updated to complete/successful. FIG. 9K illustrates the current set of process instances for schedule instance 11 after deleting the process instance corresponding to data partition 3 from schedule instance 11.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A process scheduling and management system comprising:
   a processing unit comprising one or more processors; and
   memory coupled with and readable by the processing unit and storing therein a set of instructions which, when executed by the processing unit, causes the process scheduling and management system to:
      identify a plurality of parameters within a data set comprising one or more data tables stored in a backend data store, wherein identifying the plurality of parameters within the data set comprises:
         receiving a selection of an application class;
         executing the selected application class; and
         identifying the plurality of parameters based on the execution of the selected application class;
      for each parameter of the identified parameters, determine a number of unique values for the parameter within the data set, wherein said determining is performed within the execution of the selected application class;
      determine a number of process instances to create of a data processing executable component, said determining comprising calculating a number of unique combinations of parameter values by multiplying together the determined number of unique values for each of the plurality of identified parameters;
      create the determined number of process instances of the data processing executable component; and
      provide to each of the process instances data corresponding to a unique combination of values of the identified parameters within the data set, wherein the unique combinations of values for the process instances are determined independently of the backend data store storing the data tables, and wherein each of the process instances is configured to retrieve a unique set of target data from the data tables, based on the unique combination of values provided to the process instance.

2. The process scheduling and management system of claim 1, wherein each of the process instances is executed within an application layer of the system, and wherein each of the process instances is configured to retrieve its unique set of target data from the backend data store, the backend data store comprising at least one of a database server or a data cache in the application layer.

3. The process scheduling and management system of claim 2, wherein the one or more data tables are not stored as partitioned tables.

4. The process scheduling and management system of claim 1, wherein the plurality of parameters identified within the data set are different from a set of additional parameters used by a partitioning scheme within the backend data store storing the data tables.

5. The process scheduling and management system of claim 1, wherein the determinations of the number of unique values for each parameter, and the determination of the number of process instances to create, are performed after and in response to an initiation of a data processing task by an application on the data set.

6. The process scheduling and management system of claim 1, wherein the unique sets of target data for multiple different process instances are stored in the same tables within the one or more data tables.

7. The process scheduling and management system of claim 1, the memory storing further instructions which, when executed by the processing unit, causes the process scheduling and management system to:
establish a child-parent link between each of the created process instances and a parent partition scheduler process.

8. The process scheduling and management system of claim 7, the memory storing further instructions which, when executed by the processing unit, causes the process scheduling and management system to:
use the parent partition scheduler process to update a status of one or more of the process instances, in response to user input received via the parent partition scheduler process.

9. The process scheduling and management system of claim 7, the memory storing further instructions which, when executed by the processing unit, causes the process scheduling and management system to:
receive, at the parent partition scheduler process, execution status messages from each of the process instances.

10. The process scheduling and management system of claim 1, wherein identifying the plurality of parameters within the data set comprises:
receiving one or more user selections corresponding to the plurality of parameters.

11. The process scheduling and management system of claim 1, wherein creating the process instances of the data processing executable component comprises:
determining that an application has initiated a data processing task on the data set;
determining the plurality of identified parameters and the number of unique values for each of the identified parameters; and
creating a record in an application run control table corresponding to each of the unique combination of values of the identified parameters.

12. A method of process scheduling and management, comprising:
identifying, by a partition scheduler computing device, a plurality of parameters within a data set comprising one or more data tables, wherein identifying the plurality of parameters within the data set comprises:
receiving a selection of an application class;
executing the selected application class; and
identifying the plurality of parameters based on the execution of the selected application class;
determining, by the partition scheduler computing device, for each parameter of the identified parameters, a number of unique values for the parameter within the data set, wherein said determining is performed within the execution of the selected application class;
determining, by the partition scheduler computing device, a number of process instances to create of a data processing executable component, said determining comprising calculating a number of unique combinations of parameter values by multiplying together the determined number of unique values for each of the plurality of identified parameters;
creating, by the partition scheduler computing device, the determined number of process instances of the data processing executable component; and
providing to each of the process instances, by the partition scheduler computing device, data corresponding to a unique combination of values of the identified parameters within the data set, wherein the unique combinations of values for the process instances are determined independently of a backend data store storing the data tables, and wherein each of the process instances is configured to retrieve a unique set of target data from the one or more data tables, based on the unique combination of values provided to the process instance.

13. The method of claim 12, further comprising:
executing each of the process instances within an application layer of a computing environment, wherein each of the process instances is configured to retrieve its unique set of target data from the backend data store, the backend data store comprising at least one of a database server or a data cache in the application layer.

14. The method of claim 12, further comprising:
establishing a child-parent link between each of the created process instances and a parent partition scheduler process;
using the parent partition scheduler process to update a status of one or more of the process instances, in response to user input received via the parent partition scheduler process; and
receiving, by the partition scheduler computing device, execution status messages from each of the process instances.

15. The method of claim 12, wherein creating the process instances of the data processing executable component comprises:
determining, by the partition scheduler computing device, that an application has initiated a data processing task on the data set;
determining, by the partition scheduler computing device, the plurality of identified parameters and the number of unique values for each of the identified parameters; and
creating, by the partition scheduler computing device, a record in an application run control table corresponding to each of the unique combination of values of the identified parameters.

16. A non-transitory computer-readable media comprising a set of instructions stored therein which, when executed by a processor, causes the processor to:
identify a plurality of parameters within a data set comprising one or more data tables, wherein identifying the plurality of parameters within the data set comprises:
receiving a selection of an application class;
executing the selected application class; and
identifying the plurality of parameters based on the execution of the selected application class;
for each parameter of the identified parameters, determine a number of unique values for the parameter within the data set, wherein said determining is performed within the execution of the selected application class;
determine a number of process instances to create of a data processing executable component, said determining comprising calculating a number of unique combinations of parameter values by multiplying together the determined number of unique values for each of the plurality of identified parameters;

create the determined number of process instances of the data processing executable component; and provide to each of the process instances data corresponding to a unique combination of values of the identified parameters within the data set, wherein the unique combinations of values for the process instances are determined independently of a backend data store storing the data tables, and wherein each of the process instances is configured to retrieve a unique set of target data from the data tables, based on the unique combination of values provided to the process instance.

17. The non-transitory computer-readable media of claim 16, further comprising instructions stored therein which, when executed by the processor, causes the processor to:

execute each of the process instances within an application layer of a computing environment, wherein each of the process instances is configured to retrieve its unique set of target data from the backend data store, the backend data store comprising at least one of a database server or a data cache in the application layer.

* * * * *

UNITED STATES PATENT AND TRADEMARK OFFICE
CERTIFICATE OF CORRECTION

PATENT NO. : 9,600,342 B2
APPLICATION NO. : 14/796643
DATED : March 21, 2017
INVENTOR(S) : Rangaraju et al.

It is certified that error appears in the above-identified patent and that said Letters Patent is hereby corrected as shown below:

On page 2, Column 2, under Other Publications, Line 1, delete "-Dimentional" and insert -- -Dimensional --, therefor.

On page 2, Column 2, under Other Publications, Line 18, delete "Algorithmsm,'"" and insert -- Algorithms," --, therefor.

On page 2, Column 2, under Other Publications, Line 21, delete "Datasetts" and insert -- Datasets --, therefor.

On page 2, Column 2, under Other Publications, Line 24, delete "Maintainance" and insert -- Maintenance --, therefor.

On page 2, Column 2, under Other Publications, Line 25, delete "Patitioning" and insert -- Partitioning --, therefor.

In Column 1, Lines 28-31, delete "Despite advances in hardware, faster processors, virtualization techniques, cloud computing, and the like, organizations still face challenges and difficulties in performing large-scale data processing tasks." and insert the same on Column 1, in Line 27 as the continuation of the same paragraph.

In Column 4, Line 17, after "process" insert -- . --.

In Column 12, Line 10, delete "Sirit" and insert -- Siri® --, therefor.

In Column 12, Line 63, delete "RDBMS)," and insert -- (RDBMS), --, therefor.

In Column 20, Line 44, delete "FIG." and insert -- FIGS. --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)

U.S. Pat. No. 9,600,342 B2

In Column 29, Lines 42-58, delete "As illustrated in FIG. 9I, an update option and corresponding functionality may allow the run-control to be edited and saved. This feature may be useful, for example, when a process instance has generated an error due to wrong data in the run control page, which may need to be corrected before re-running the process instance. As illustrated in FIG. 9J, a delete option and the corresponding functionality may be provided to remove a process instance from the schedule instance. This feature may be useful, for example, when a particular process instance is no longer useful for a schedule instance and/or is generating errors and blocking the success completion of the schedule instance, in which case the process instance may be deleted so that the status of the schedule instance may be updated to complete/successful. FIG. 9K illustrates the current set of process instances for schedule instance 11 after deleting the process instance corresponding to data partition 3 from schedule instance 11." and insert the same on Column 29, in Line 41 as the continuation of the same paragraph.